US010205352B2

(12) United States Patent
Eguchi

(10) Patent No.: US 10,205,352 B2
(45) Date of Patent: Feb. 12, 2019

(54) POWER RECEIVING APPARATUS, POWER TRANSMITTING APPARATUS, CONTROL METHOD, AND STORAGE MEDIUM

(71) Applicant: CANON KABUSHIKI KAISHA, Tokyo (JP)

(72) Inventor: Tadashi Eguchi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 328 days.

(21) Appl. No.: 15/040,120

(22) Filed: Feb. 10, 2016

(65) Prior Publication Data

US 2016/0241047 A1 Aug. 18, 2016

(30) Foreign Application Priority Data

Feb. 17, 2015 (JP) ................. 2015-028862
Feb. 17, 2015 (JP) ................. 2015-028863

(51) Int. Cl.
H02J 50/80 (2016.01)
H02J 50/40 (2016.01)

(52) U.S. Cl.
CPC ............ H02J 50/80 (2016.02); H02J 50/40 (2016.02)

(58) Field of Classification Search
None
See application file for complete search history.

(56) References Cited

U.S. PATENT DOCUMENTS

| 2012/0056497 | A1* | 3/2012 | Suzuki | H02J 5/005 |
| | | | | 307/149 |
| 2013/0328417 | A1 | 12/2013 | Takeuchi | |
| 2014/0239734 | A1* | 8/2014 | Masaoka | H02J 17/00 |
| | | | | 307/104 |
| 2014/0344591 | A1 | 11/2014 | Ito | |
| 2014/0361739 | A1* | 12/2014 | Kwak | H02J 5/005 |
| | | | | 320/108 |

FOREIGN PATENT DOCUMENTS

| CN | 102684316 A | 9/2012 |
| CN | 102823109 A | 12/2012 |
| CN | 103348563 A | 10/2013 |

(Continued)

OTHER PUBLICATIONS

European search report issued in corresponding application No. 16000221.8 dated Jun. 29, 2016.

(Continued)

Primary Examiner — Cassandra Cox
(74) Attorney, Agent, or Firm — Carter, DeLuca, Farrell & Schmidt, LLP

(57) ABSTRACT

A power receiving apparatus, that complies with at least two power transfer methods and receives power wirelessly from a power transmitting apparatus, detects unexpected power which is not power transmitted from the power transmitting apparatus while a first power transfer method is used out of the at least two power transfer methods. When the unexpected power is detected, the power receiving apparatus controls the power transmitting apparatus and the power receiving apparatus so that a second power transfer method which is different from the first power transfer method out of the at least two power transfer methods is used.

19 Claims, 12 Drawing Sheets

(56) References Cited

FOREIGN PATENT DOCUMENTS

| | | | |
|---|---|---|---|
| CN | 103828193 | A | 5/2014 |
| EP | 2782210 | A1 | 9/2014 |
| JP | 2009523402 | A | 6/2009 |
| JP | 2010-063245 | A | 3/2010 |
| JP | 2011-125211 | A | 6/2011 |
| JP | 2011199975 | A | 10/2011 |
| JP | 2012-518381 | A | 8/2012 |
| JP | 2012-205485 | A | 10/2012 |
| JP | 5124991 | B2 | 1/2013 |
| JP | 5188211 | B2 | 4/2013 |
| JP | 2014128149 | A | 7/2014 |
| JP | 2015-006096 | A | 1/2015 |
| KR | 10-2012-0137405 | A | 12/2012 |
| WO | 2010/093973 | A2 | 8/2010 |
| WO | 2012111271 | A1 | 8/2012 |

OTHER PUBLICATIONS

Chinese Office Action dated Feb. 27, 2018 and issued in corresponding Chinese Patent Application No. 201610072566.4 together with English translation.

Notification of Reason for Refusal issued by the Korean Intellectual Property Office dated Dec. 3, 2018 in corresponding Korean Patent Application No. 10-2016-0016087, with English translation.

Japanese Office Action dated Dec. 7, 2018 in corresponding Japanese Patent Application No. 2015-028863, with English translation.

* cited by examiner

POWER RECEIVING APPARATUS, POWER TRANSMITTING APPARATUS, CONTROL METHOD, AND STORAGE MEDIUM

BACKGROUND OF THE INVENTION

Field of the Invention

The present invention relates to a wireless power transfer technique.

Description of the Related Art

There is known a wireless power transfer system which includes a power transmitting apparatus for wirelessly transmitting power and a power receiving apparatus for receiving power supplied from the power transmitting apparatus and in which wireless power transfer is performed from the power transmitting apparatus to the power receiving apparatus. The wireless power transfer method broadly includes three kinds of methods, that is, the electromagnetic induction method, the microwave transfer method, and the resonant magnetic coupling method.

The basic principle of the electromagnetic induction method is to make an inductive current run in a power receiving coil by causing a magnetic flux which is generated from running a current in a power transmitting coil to penetrate the power receiving coil. Therefore, in the electromagnetic induction method, the positions of the power transmitting coil and the power receiving coil are generally adjusted so that the magnetic flux generated by the power transmitting coil effectively penetrates the power receiving coil.

In the microwave transfer method, the power transmitting apparatus emits wireless power in the air by an antenna and the power is received by the antenna of the power receiving apparatus. Since power loss in the air increases in the microwave transfer method, power transfer is generally performed in a specific direction by increasing the directionality of the antenna.

In the resonant magnetic coupling method, power transfer is performed by causing the power transmitting apparatus and the power receiving apparatus to resonate at the same frequency. Power transfer (with at least sufficient power) cannot be performed unless the power transmitting apparatus and the power receiving apparatus can resonate at the same frequency. Japanese Patent Laid-Open No. 2010-063245 and Japanese Patent Laid-Open No. 2012-518381 disclose methods that allow power to be transmitted selectively to one power receiving apparatus as a power transmission target out of a plurality of power receiving apparatuses by using this feature to cause the power transmitting apparatus to change the resonance frequency. Note that in the case of the resonant magnetic coupling method, since it is sufficient for the power transmitting apparatus and the power receiving apparatus near there to resonate at the same frequency, the method is not sensitive to positional accuracy compared to the electromagnetic induction method and cannot ensure that a transfer efficiency will be high only in the desired direction as in the case of using microwaves.

The resonant magnetic coupling method wireless power transfer system is an effective method for selectively transferring power to a plurality of power receiving apparatuses when the resonance frequencies are different and the resonance frequency bandwidths are narrow. The transfer efficiency of power transmission/reception using the resonant magnetic coupling method depends on a coupling coefficient $k_i$ between the power transmitting circuit and the impedance of the power transmitting antenna, a coupling coefficient $k_u$ between the antennas at the non-load time which is influenced by the distance between and the sizes of the antennas, and a coupling coefficient $k_o$ between the power receiving antenna and the impedance of the power receiving circuit.

The maximum transfer efficiency is obtained when $k_u \geq \sqrt{(k_i \times k_o)}$, and especially when $k_u = \sqrt{(k_i \times k_o)}$, the resonance frequency between the antennas match with the resonance frequency $f0$ of each single antenna. This state is called critical coupling. When the distance between the power transmission/reception antennas is short and $k_u > \sqrt{(k_i \times k_o)}$, two resonance frequencies that are lower and higher, respectively, than the resonance frequency $f0$ will be generated between the power transmission/reception antennas. This state is called tight coupling. On the other hand, when the distance between the power transmission/reception antennas is long and $k_u < \sqrt{(k_i \times k_o)}$, the resonance point (resonance frequency) of the power transmission/reception antennas is in the same state as critical coupling, but the coupling efficiency decreases. This state is called loose coupling.

FIGS. 12A and 12B each schematically show the relationship between the coupling efficiency and the frequency in the cases of tight coupling, critical coupling, and loose coupling. As shown in FIG. 13, note that in the actual environment of usage, by causing the coupling to become closer to tight coupling than critical coupling, an adjustment can be performed to prevent the efficiency from decreasing even if the distance to the antenna incorporated in the power receiving apparatus more or less shifts, and thus maintain the efficiency. However, if the adjustment as shown in FIG. 13 is made, since the frequency band with high transfer efficiency between the antennas is wide, resonance occurs at a wide frequency band.

In such a case, if power transfer from a second power transmitting apparatus to a second power receiving apparatus is started while power is transferred between a first power transmitting apparatus and a first power receiving apparatus, the power transmitted from each power transmitting apparatus can be received by an apparatus that is not the power receiving apparatus which is the original partner apparatus of the power transfer. That is, power transmitted from the first power transmitting apparatus can be received by the second power receiving apparatus, and the power transmitted from the second power transmitting apparatus can be received by the first power receiving apparatus. In such a case, there is a possibility that the originally intended power transmission/reception cannot be performed.

The present invention provides a technique that prevents transmitted power from being received by an apparatus that is different from the target apparatus of power transmission.

SUMMARY OF THE INVENTION

According to one aspect of the present invention, there is provided a power receiving apparatus that complies with at least two power transfer methods and receives power wirelessly from a power transmitting apparatus, comprising: a detecting unit configured to detect power transmitted from another power transmitting apparatus which is different from the power transmitting apparatus while a first power transfer method is used out of the at least two power transfer methods; and a control unit configured to control, when the power transmitted from the other power transmitting apparatus is detected, the power transmitting apparatus and the power receiving apparatus so that a second power transfer method different from the first power transfer method out of the at least two power transfer methods is used.

According to another aspect of the present invention, there is provided a power transmitting apparatus that complies with at least two power transfer methods and transmits power wirelessly to a power receiving apparatus, comprising: a power transmitting unit configured to transmit power to the power receiving apparatus by using one of the at least two power transfer methods; a detecting unit configured to detect that, while a first power transfer method is used out of the at least two power transfer methods, at least either the power receiving apparatus receives power transmitted from another power transmitting apparatus or another power receiving apparatus receives power transmitted from the power transmitting apparatus, that is caused by that the other power transmitting apparatus and the other power receiving apparatus perform power transfer; and a control unit configured to control, when the detecting unit detects that at least either the power receiving apparatus receives power transmitted from the other power transmitting apparatus or the other power receiving apparatus receives power transmitted from the power transmitting apparatus, the power transmitting unit to use a second power transfer method different from the first power transfer method out of the at least two power transfer methods.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangement of Wireless Power Transfer System)

Figure 1:
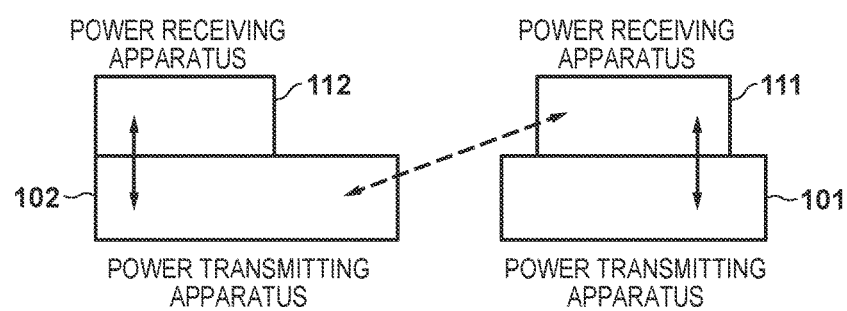
FIG. 1 is a view showing an example of the arrangement of a wireless power transfer system.

FIG. 1 shows an example of the arrangement of a wireless power transfer system according to each embodiment. Note that the wireless power transfer system according to each embodiment performs wireless power transfer by using the resonant magnetic method. In FIG. 1, wireless power transfer (WPT) is performed between one pair of apparatuses, a power transmitting apparatus 102 and a power receiving apparatus 112, while WPT between another pair of apparatuses, a power transmitting apparatus 101 and a power receiving apparatus 111, is about to be started nearby.

In this case, transmission power of the power transmitting apparatus 102 can be received by the power receiving apparatus 111 which is different from the power receiving apparatus 112 that is the WPT partner apparatus of the power transmitting apparatus 102. Conversely, the transmission power of the power transmitting apparatus 101 can be received by the power receiving apparatus 112 which is different from the power receiving apparatus 111 that is the WPT partner apparatus of the power transmitting apparatus 101. Thus, the power receiving apparatuses 111 and 112 can receive power (to be referred to as "unexpected power", hereinafter) that is unexpected. Such transmission power of the power transmitting apparatus 102 is unexpected power for the power receiving apparatus 111 and is a source of interference for WPT between the power transmitting apparatus 101 and the power receiving apparatus 111. In the same manner, the transmission power of the power transmitting apparatus 101 is unexpected power for the power receiving apparatus 112 and is a source of interference for WPT between the power transmitting apparatus 102 and the power receiving apparatus 112.

Figure 2A:
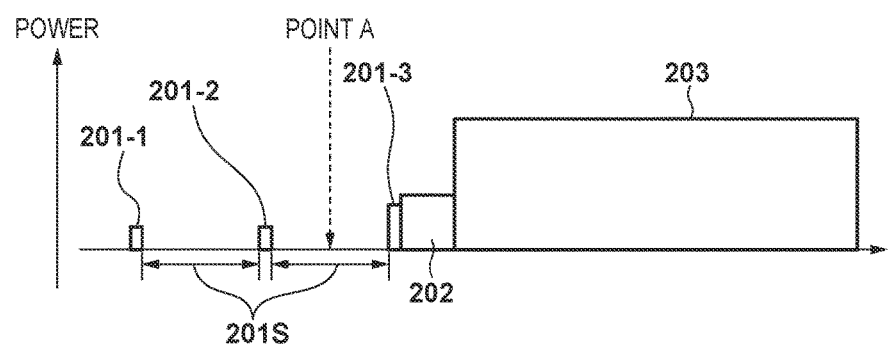
FIGS. 2A and 2B are sequence charts each showing the state of power transmission in the wireless power transfer system.

The power transmitting sequence of a general power transfer operation is shown in FIG. 2A. In FIG. 2A, the abscissa shows the course of time and the ordinate direction shows the power consumption of the power transmitting apparatus 101/102. The power transmitting apparatus 101/102 transmits placement confirming power, that is, 201-1, 201-2, and 201-3 intermittently in predetermined cycles to detect placement of the power receiving apparatuses 111/112. When no power receiving apparatus is placed, the placement confirming power is hardly consumed and becomes reflected power. If the power receiving apparatus 111/112 is placed at point A, the impedance of the power transmitting period changes due to reasons such as power being consumed in the power receiving apparatus 111/112 or the like. The power transmitting apparatus 101/102 can determine whether the power receiving apparatus 111/112 has been placed by detecting the amount of change in the impedance, a change in reflected power, or the power consumption of the transmission power (e.g., by the placement confirming power 201-3). Upon detecting that the power receiving apparatus 111/112 has been placed on the power transmitting apparatus 101/102, the power transmitting apparatus 101/102 transmits authentication power 202 to the power receiving apparatus 111/112. Upon detecting the authentication power, the power receiving apparatus 111/112 transmits an authentication signal to the power transmitting apparatus 101/102. When authentication of the power receiving apparatus 111/112 has been completed, the power transmitting apparatus 101/102 starts full power transmission 203.

First Embodiment

Figure 2B:
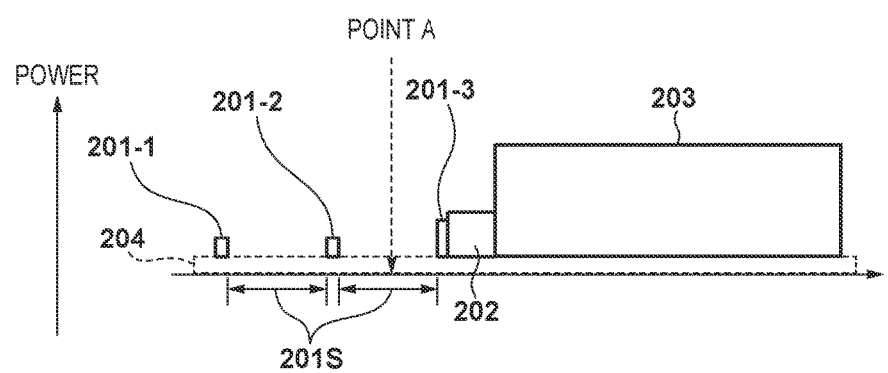

If the power transmitting apparatus 102, which is another apparatus different from the power transmitting apparatus 101 that is the power transmission/reception partner apparatus, is near the power transmitting apparatus 101, the power receiving apparatus 111 receives part of the power being transmitted from the power transmitting apparatus 102 to the power receiving apparatus 112 together with the placement confirming power from the power transmitting apparatus 101. FIG. 2B shows the state of power detectable by the power receiving apparatus 111 in this case. In FIG. 2B, in addition to the respective kinds of power in FIG. 2A, power 204 transmitted from the power transmitting apparatus 102 to the power receiving apparatus 112 becomes detectable by the power receiving apparatus 111. Note that the power 204 transmitted from the power transmitting apparatus 102 to the power receiving apparatus 112 is unexpected power for the power receiving apparatus 111.

If the power receiving apparatus 111 simultaneously receives this unexpected power and the power transmitted from the power transmitting apparatus 101 which is the WPT partner apparatus, the combined power can become unstable. Furthermore, if there is a difference in transmission power between the power transmitting apparatuses 101 and 102, the apparatus that is supposed to originally receive a small amount of power, out of the power receiving apparatuses 111 and 112, can be destroyed by receiving unexpected power.

On the other hand, if unexpected extra power is transmitted, the power transmitting apparatus 101 or 102 may determine that the power transmission was made to a foreign object and stop the power transmission. That is, the power transmitting apparatus 102 and the power receiving apparatus 112 that were executing WPT will have to automatically stop performing WPT.

If the power transmission/reception partner is to be specified by changing the frequency band, as in Japanese Patent Laid-Open No. 2010-063245 and Japanese Patent Laid-Open No. 2012-518381, either the transfer efficiency will have to be sacrificed to a degree in which critical coupling changes to loose coupling or the frequency will have to be greatly changed by being adjusted toward tight coupling from critical coupling. However, in some cases greatly changing the frequency can be difficult in terms of laws and regulations.

In contrast, the power receiving apparatus 111 according to the first embodiment includes at least two power receiving units in compliance with different wireless power transfer methods. When detecting a power transmitting apparatus that is different from the power transmitting apparatus 101 which is the WPT partner apparatus of itself, the power receiving apparatus 111 switches the wireless power transfer method.

The wireless power transfer method is, for example, a method which complies with the standards of the Wireless Power Consortium (WPC), Power Matter Alliance (PMA), or Alliance for Wireless Power (A4WP). Note that WPC and PMA have wireless power transfer standards using mainly the electromagnetic induction method at bands of 100 to 200 kHz, and A4WP has a wireless power transfer standard using the resonant magnetic coupling method at 6.78 MHz. The power receiving apparatus 111 and the power transmitting apparatus 101 comply with, for example, at least two of these wireless power transfer methods.

Also, as shown in FIG. 2B, since the placement confirming power is transmitted intermittently in a predetermined cycle from the power transmitting apparatus 101, in periods (intermittent periods 201S) where there is no transmission of the placement confirming power, the power receiving apparatus 111 can receive only the unexpected power 204 transmitted from the power transmitting apparatus 102. Therefore, by detecting the unexpected power 204 in the intermittent periods 201S, the power receiving apparatus 111 can know the existence of the power transmitting apparatus 102 that is arranged nearby and is a different apparatus from the power transmitting apparatus 101 which is the WPT partner apparatus of itself.

The arrangements and operations of such power transmitting apparatus 101 and power receiving apparatus 111 will be described below.

(Arrangement of Power Receiving Apparatus)

Figure 3:
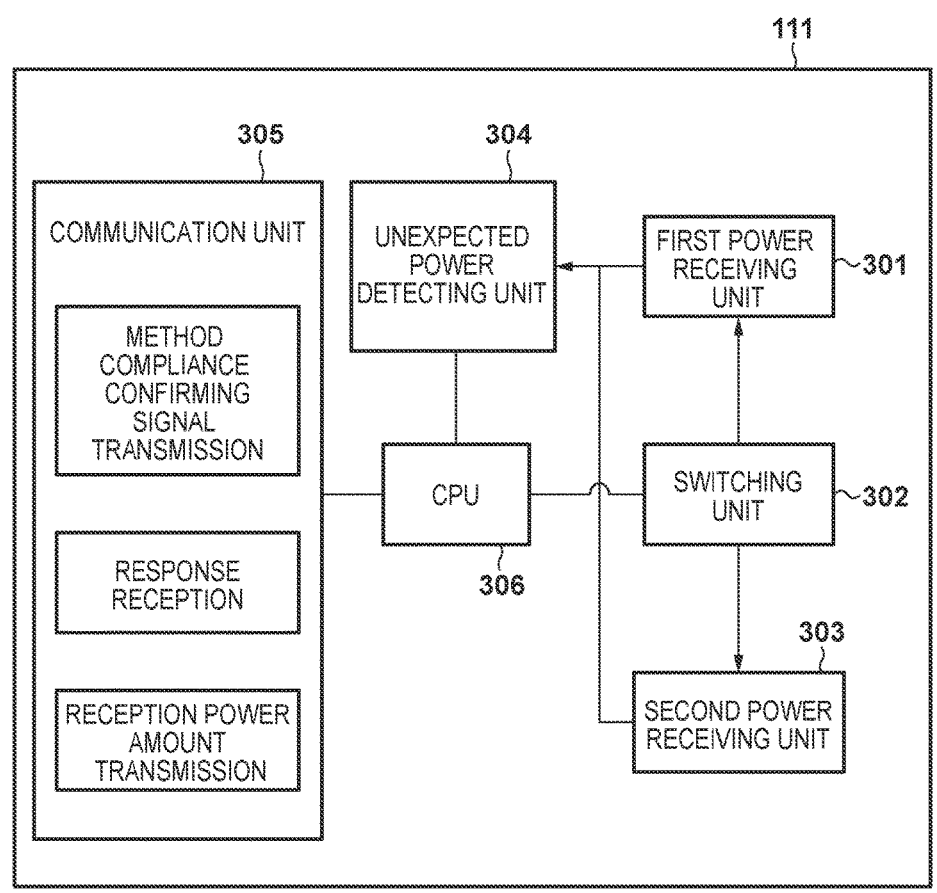
FIG. 3 is a block diagram showing an example of the arrangement of a power receiving apparatus.

FIG. 3 shows an example of the arrangement of the power receiving apparatus 111. The power receiving apparatus 111 includes in the arrangement, for example, a first power receiving unit 301, a switching unit 302, a second power receiving unit 303, an unexpected power detecting unit 304, a communication unit 305, and a CPU 306. For example, the first power receiving unit 301 complies with the resonant magnetic coupling method and the second power receiving unit 303 complies with the electromagnetic induction method, and the power receiving apparatus 111 uses either the first power receiving unit 301 or the second power receiving unit 303 to receive power transmitted from the power transmitting apparatus 101. The switching unit 302 performs control to switch between using the first power receiving unit 301 and the second power receiving unit 303 in order to receive power transmitted from the power transmitting apparatus 101. The unexpected power detecting unit 304 detects, as described above, the unexpected power 204 in the intermittent periods 201S. That is, the unexpected power detecting unit 304 can monitor whether unexpected power will be received by the power receiving unit used for power reception processing, for example, out of the first power receiving unit 301 and the second power receiving unit 303, in the intermittent periods 201S. The communication unit 305 performs communication with the WPT partner apparatus (power transmitting apparatus 101). The CPU 306 controls each function of the power receiving apparatus 111 based on, for example, a memory (a RAM or a ROM) (not shown) or a program stored in another storage device. Note that although the CPU 306 is described as a "CPU", it can be replaced by one or more processors other than this.

When the unexpected power detecting unit 304 detects unexpected power, the CPU 306 controls the communication unit 305 so that a method compliance confirming signal is transmitted to the power transmitting apparatus 101. For example, if the power receiving apparatus 111 is receiving power by using the first power receiving unit 301, this method compliance confirming signal includes information about the wireless power transfer method and frequency of the second power receiving unit 303. For example, if the power receiving apparatus 111 is receiving power by using the second power receiving unit 303, the method compliance confirming signal includes information about the wireless power transfer method and frequency of the first power receiving unit 301. The communication unit 305 receives a response from the power transmitting apparatus 101, and the CPU 306 determines, depending on the response, whether the power transmitting apparatus 101 complies with the wireless power transfer method and frequency specified by the method compliance confirming signal. If the power transmitting apparatus 101 complies with the wireless power transfer method and frequency specified by the method compliance confirming signal, the CPU 306 controls the switching unit 302 to switch the wireless power transfer method. That is, if the power receiving apparatus 111 is receiving power by using the first power receiving unit 301, the CPU 306 controls the switching unit 302 to use the second power receiving unit 303. If the power receiving apparatus 111 is receiving power by using the second power receiving unit 303, the CPU 306 controls the switching unit 302 to use the first power receiving unit 301. After switching the power receiving unit, the power receiving apparatus 111 waits for the power transmitting apparatus 101 to perform power transmission start processing. Upon receiving the above-described method compliance confirming signal, the power transmitting apparatus 101 switches the wireless power transfer method so that power transfer can be executed in the wireless power transfer method and frequency specified by the method compliance confirming signal and performs power transmission start processing by the switched wireless power transfer method. After this power transmission start processing is completed, the power receiving apparatus 111 starts receiving power by the switched wireless power transfer method. Note that if the wireless power transfer method before the switching can receive a larger amount of power or receive power with higher efficiency, the method can be, for example, cyclically switched back to the method before the switching and power can be received by the method before the switching if no unexpected power is detected.

(Processing Sequence of Power Receiving Apparatus)

Figure 4:
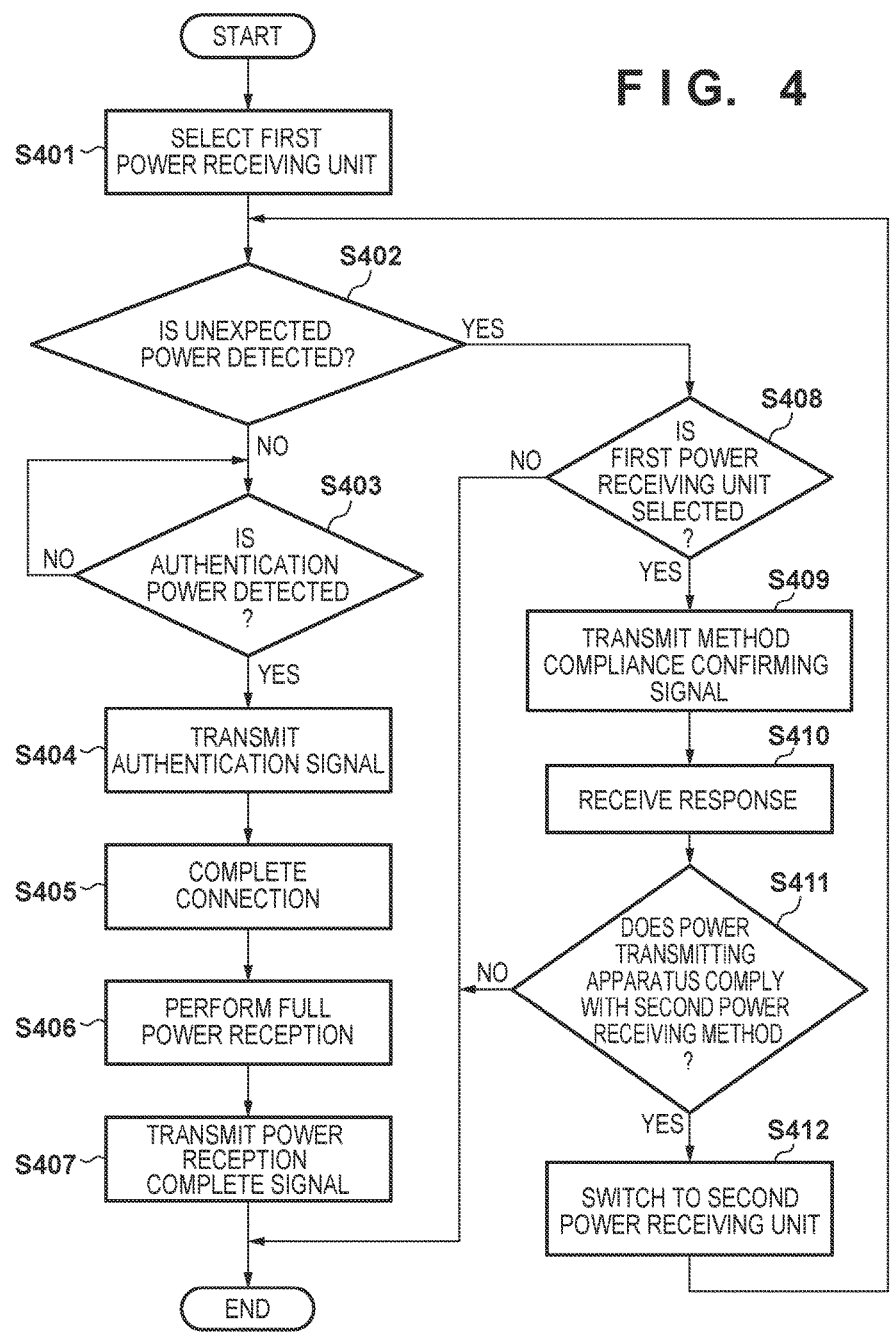
FIG. 4 is a flowchart showing an example of the operation of the power receiving apparatus.

FIG. 4 shows an example of the sequence of processing executed by the power receiving apparatus 111. The power receiving apparatus 111 starts the processing of FIG. 4, for example, when it is placed on a power transmitting apparatus or when a switch is pressed. Processing in which the power receiving apparatus 111 includes two power receiving units, the first power receiving unit 301 and the second power receiving unit 303, will be described below. However, the present invention is not limited to this. The power receiving apparatus 111 suffices to include at least two power receiving units and can have three or more power receiving units.

First, based on a condition such as the maximum reception power amount or efficiency, the power receiving apparatus 111 selects the first power receiving unit 301 (step S401) out of the plurality of power receiving units (first power receiving unit 301 and the second power receiving unit 303) that comply with the plurality of wireless power transfer methods to which the power receiving apparatus 111 itself complies with. Next, while executing the power reception processing, the power receiving apparatus 111 monitors the presence/absence of unexpected power by the unexpected power detecting unit 304 (step S402). Note that, as described above, the unexpected power detecting unit 304 monitors whether the currently used power receiving apparatus (first power receiving unit 301 in this case) has received unexpected power during the intermittent periods 201S of the placement confirming power.

If the unexpected power detecting unit 304 detects unexpected power (YES in step S402), it is confirmed whether the currently selected power receiving unit is the first power receiving unit (step S408). Note that the confirming operation in step S408 is for confirming whether there is a power receiving unit that has not been selected since the start of the processing of FIG. 4. That is, in this case, whether the first power receiving unit is selected (whether the second power receiving unit is not selected) is determined based on a premise that the power receiving apparatus 111 includes the first power receiving unit 301 and the second power receiving unit 303 and that the first power receiving unit 301 has been initially selected. Therefore, if the power receiving apparatus 111 includes three or more power receiving units, the determination of step S408 can be replaced by a determination for confirming whether there is a power receiving unit that has not been selected after the start of processing in FIG. 4.

If the selected power receiving unit is the first power receiving unit (YES in step S408), the power receiving apparatus 111 transmits, via the communication unit 305, a method compliance confirming signal which includes information about the wireless power transfer method and frequency of the second power receiving unit 303 to the power transmitting apparatus 101 (step S409). Note that if the power receiving apparatus 111 includes three or more power receiving units and when at least two of the power receiving units have not been selected after the start of processing in FIG. 4, one is selected out of the power receiving units that have not been selected. Then, the power receiving apparatus 111 includes the information about the wireless power transfer method and frequency of the selected power receiving unit in the method compliance confirming signal and transmits the signal.

Subsequently, upon receiving a response from the power transmitting apparatus 101 via the communication unit 305 (step S410), the power receiving apparatus 111 determines whether the power transmitting apparatus 101 can comply with the wireless power transfer method and frequency of the second power receiving unit 303 (step S411). That is, the power receiving apparatus 111 determines, based on the received response, whether the power transmitting apparatus 101 can comply with the wireless power transfer method and frequency included in the method compliance confirming signal. If it is determined that the power transmitting apparatus 101 can comply with the wireless power transfer method and frequency of the second power receiving unit 303 (YES in step S411), the power receiving apparatus 111 switches the power receiving unit to the second power receiving unit 303 by the switching unit 302 (step S412). The power receiving apparatus 111 then determines the presence/absence of unexpected power (step S402) while waiting to receive placement confirming power of the wireless power transfer method and frequency of the second power receiving unit 303.

On the other hand, if it is determined that the power transmitting apparatus 101 cannot comply with the wireless power transfer method and frequency of the second power receiving unit 303 (NO in step S411), the power receiving apparatus 111 directly terminates the power reception processing. Note that if the power receiving apparatus 111 includes three or more power receiving units and when the power transmitting apparatus 101 cannot comply with the wireless power transfer method and frequency included in the method compliance confirming signal, the process can be returned to, for example, step S408 rather than directly terminating the processing. In this case, the power receiving apparatus 111 subsequently determines, in step S408, whether there is another power receiving unit that has not been selected after the start of processing of FIG. 4 and terminates the processing if no such power receiving unit exists.

If the power receiving apparatus 111 receives unexpected power even after selecting the second power receiving unit (YES in step S402, NO in subsequent step S408), power reception is terminated because unexpected power will be received by either method. Note that if the power receiving apparatus 111 includes three or more power receiving units, power reception can be terminated when it is determined that there is no power receiving unit in which the determination of the presence/absence of unexpected power has not been performed in step S408 after the unexpected power has been detected in step S402. Note that, in the example of FIG. 4, although power reception is completed to avoid receiving unexpected power continuously, the power receiving apparatus 111 can include a timer to resume power reception and resume the processing of FIG. 4 upon expiration of the timer.

If the power receiving apparatus 111 stops receiving the unexpected power from selecting the second power receiving unit 302 (NO in step S402), the power receiving apparatus 111 subsequently waits to receive the authentication power (step S403). Note that, for example, if the wireless power transfer method of the second power receiving unit 303 is a method that will have difficulty in power reception if the positions of the power transmitting coil and the power receiving coil are not matching such as the electromagnetic induction method, it can be assumed that the probability of detecting unexpected power from another power transmitting apparatus will be sufficiently low. Upon detecting the authentication power (YES in step S403), the power receiving apparatus 111 subsequently transmits the authentication signal (step S404) and starts full power reception (step S406) after connection is completed (step S405). Afterwards, when power reception is to be completed after the start of full power reception, the power receiving apparatus 111 transmits a power reception complete signal to the power transmitting apparatus 101 (step S407) and terminates the power reception processing. The power receiving apparatus 111 can transmit, via the communication unit 305, the reception power amount to the power transmitting apparatus 101 during full power reception to confirm whether power is being received at an appropriate efficiency.

If the power receiving apparatus 111 itself is placed on the power transmitting apparatus as a second or subsequent power receiving apparatus which uses the resonant magnetic coupling method, the power receiving apparatus 111 can detect continuous power instead of detecting the placement confirming power in step S402. If the placement confirming power is not detected, but continuous power is detected in step S402, the power receiving apparatus 111 need not determine that this detected power is unexpected power (NO in step S402). If the continuous power being received has sufficient power to be the authentication power (YES in step S403), the power receiving apparatus 111 transmits the authentication signal (step S404). As a result, if the power transmitting apparatus 101 has sufficient power transmitting capability for performing power transmission to the second or subsequent power receiving apparatus, the power receiving apparatus 111 completes the connection to the power transmitting apparatus 101 (step S405) and can perform full power reception (step S406).

(Arrangement of Power Transmitting Apparatus)

Figure 5:
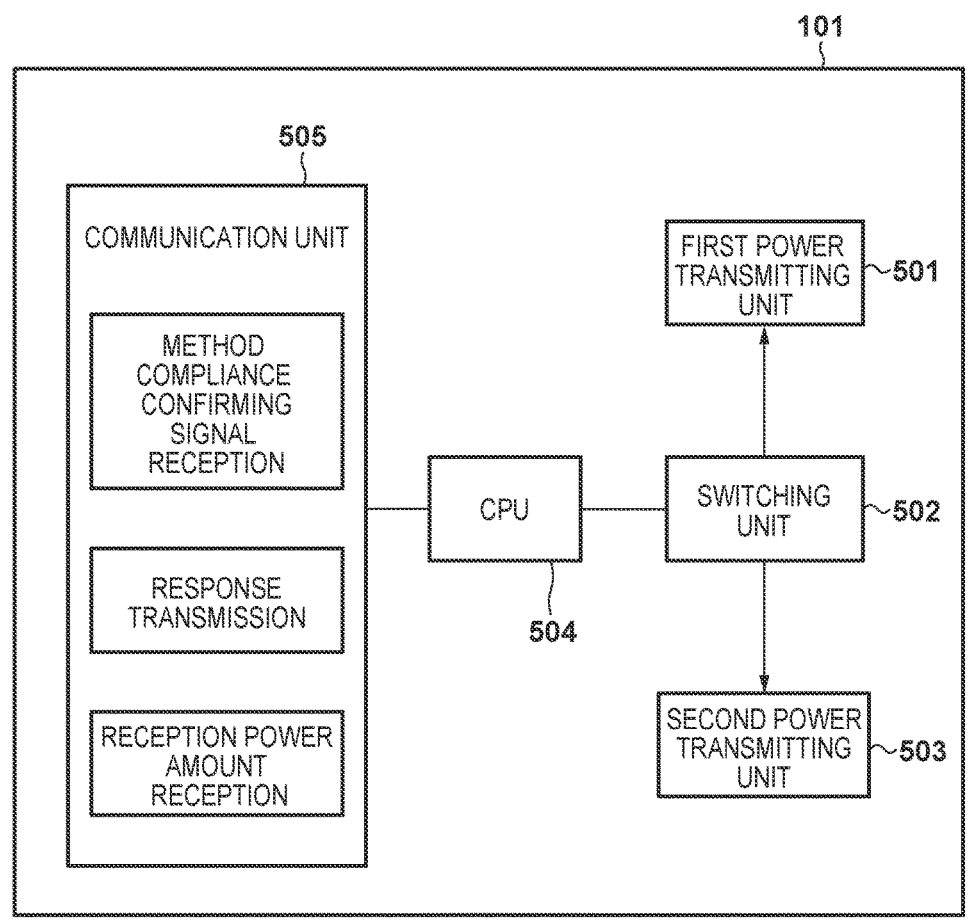
FIG. 5 is a block diagram showing an example of the arrangement of a power transmitting apparatus.

The arrangement of the power transmitting apparatus 101 will be described next. FIG. 5 shows an example of the arrangement of the power transmitting apparatus 101. The power transmitting apparatus 101 includes in the arrangement, for example, a first power transmitting unit 501, a switching unit 502, a second power transmitting unit 503, a CPU 504, and a communication unit 505. For example, the first power transmitting unit 501 complies with the resonant magnetic coupling method and the second power transmitting unit 503 complies with the electromagnetic induction method, and the power transmitting apparatus 101 transmits power to the power receiving apparatus 111 by using either the first power transmitting unit 501 or the second power transmitting unit 503. The switching unit 502 performs control to switch between using the first power transmitting unit 501 and the second power transmitting unit 503 in order to transmit power to the power receiving apparatus 111. The communication unit 505 performs communication with the WPT partner apparatus (power receiving apparatus 111).

The CPU 504 controls each function of the power transmitting apparatus 101 based on, for example, a memory (a RAM or a ROM) (not shown) or a program stored in another storage device. Note that although the CPU 504 is described as a "CPU", it can be replaced by one or more processors other than this. The CPU 504 receives, for example, the method compliance confirming signal via the communication unit 505 and determines whether the first power transmitting unit 501 or the second power transmitting unit 503 can comply with the wireless power transfer method and frequency specified by the received signal. If either the first power transmitting unit 501 or the second power transmitting unit 503 can comply with the specified wireless power transfer method and frequency, the CPU 504 controls the switching unit 502 to perform power transmission by using the power transmitting unit that can comply with the specified method and frequency. Additionally, the CPU 504 controls the communication unit 505 so that a signal including information about whether switching the power transmitting unit is possible can be transmitted as a response signal to the method compliance confirming signal from the power receiving apparatus.

(Processing Sequence of Power Transmitting Apparatus)

Figure 6:
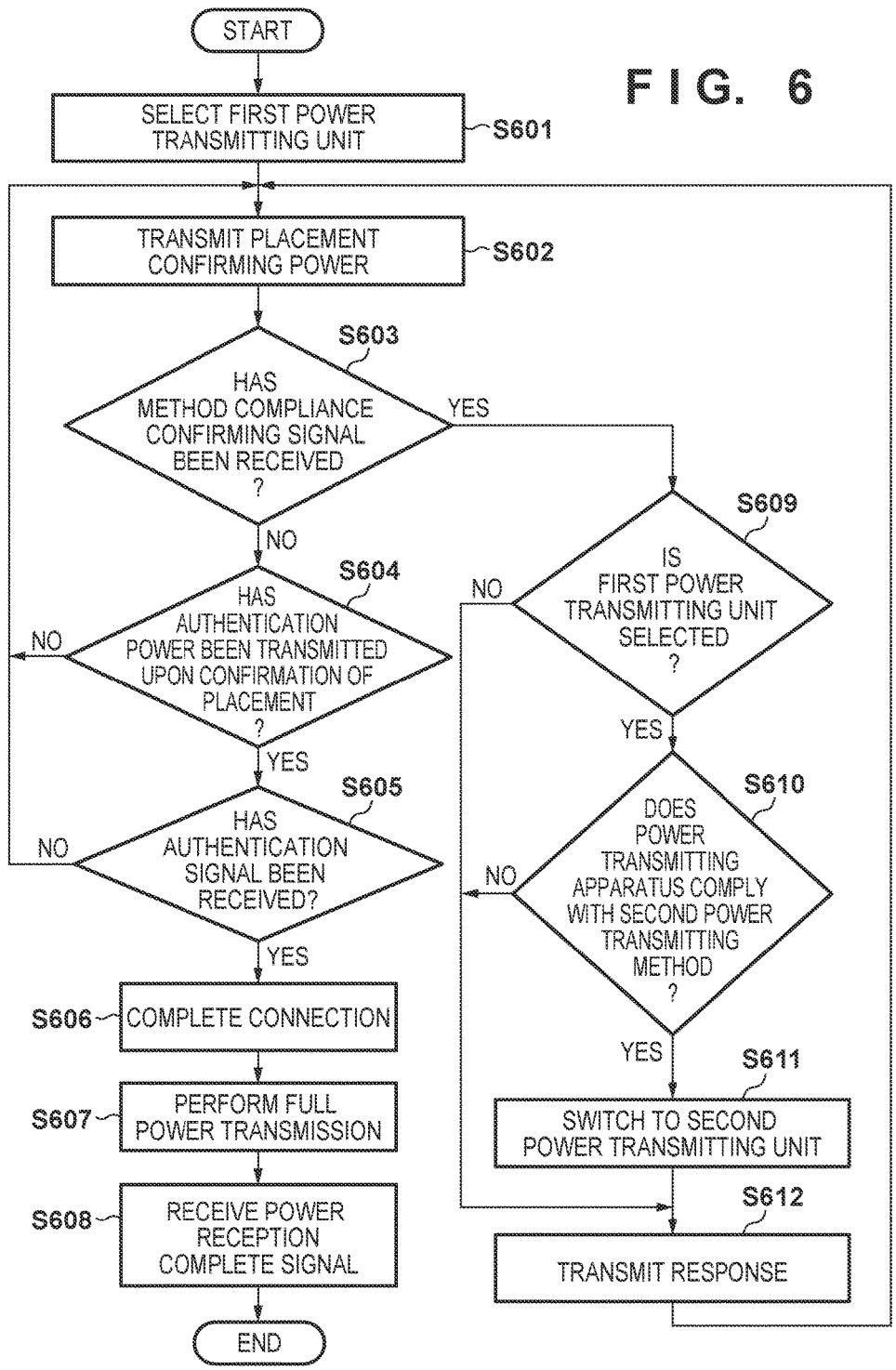
FIG. 6 is a flowchart showing an example of the operation of the power transmitting apparatus.

FIG. 6 shows an example of the sequence of the processing executed by the power transmitting apparatus 101. The power transmitting apparatus 101 starts the processing of FIG. 6, for example, when a switch is pressed or when a power receiving apparatus is placed. Processing in which the power transmitting apparatus 101 includes two power transmitting units, the first power transmitting unit 501 and the second power transmitting unit 503, will be described below. However, the present invention is not limited to this. That is, the power transmitting apparatus 101 suffices to include, for example, at least one power transmitting unit and can have three or more power transmitting units.

First, based on a condition such as the maximum reception power amount or efficiency, the power transmitting apparatus 101 selects the first power transmitting unit 501 (step S601) out of the plurality of power transmitting units (first power transmitting unit 501 and the second power transmitting unit 503) that comply with the plurality of wireless power transfer methods to which the power transmitting apparatus 101 itself complies with. Next, the power transmitting apparatus 101 transmits the placement confirming power via the first power transmitting unit 501 (step S602). At this time, the power transmitting apparatus 101 also confirms whether the method compliance confirming signal has been received from the placed power receiving apparatus 111 (step S603). Upon receiving the method compliance confirming signal from the power receiving apparatus 111 (YES in step S603), the power transmitting apparatus 101 determines whether there is a power transmitting unit that has not been selected after the start of the processing of FIG. 6 (step S609). Note that, in this case, since the power transmitting apparatus 101 includes only the first power transmitting unit 501 and the second power transmitting unit 503, the determination in step S609 is performed by determining whether the currently used power transmitting unit is the first power transmitting unit 501.

If the first power transmitting unit 501 is selected as the currently used power transmitting unit (YES in step S609), the power transmitting apparatus 101 determines whether a power transmitting unit included in the power transmitting apparatus 101 complies with the wireless power transfer method and frequency specified by the received method compliance confirming signal (step S610). In this case, the electromagnetic induction method and its corresponding frequency complying with the second power receiving unit 303 of the power receiving apparatus 111 are specified by the method compliance confirming signal. Therefore, the power transmitting apparatus 101 confirms whether the second power transmitting unit 503 which complies with the electromagnetic induction method can comply with the specified frequency. If the power transmitting apparatus 101 has the power transmitting unit that can comply with the specified wireless power transfer method and frequency (YES in step S610), the power transmitting unit is switched to the power transmitting unit (second power transmitting unit 503) that can comply with the specified wireless power transfer method and frequency (step S611). Additionally, in this case, the power transmitting apparatus 101 transmits the response signal which indicates that the second power transmitting unit 503 complies with the wireless power transfer method and frequency specified by the method compliance confirming signal (step S612). Note that the response signal is transmitted (step S612) even if there is no power transmitting unit that has not been selected after the start of the processing (when the second power transmitting unit 503 is selected in this case, NO in step S609) or if the second power transmitting unit 503 cannot comply with the specified wireless power transfer method and frequency (NO in step S610). In that case, however, a response signal which indicates that no power transmitting unit can comply with the specified wireless power transfer method and frequency will be transmitted.

After the power transmitting unit is switched to the second power transmitting unit 503, the power transmitting apparatus 101 transmits the placement confirming power (step S602). If the power transmitting apparatus 101 confirms the placement of the power receiving apparatus 111 without subsequently receiving the method compliance confirming signal from the power receiving apparatus 111 (NO in step S603), the authentication power is transmitted to the power receiving apparatus 111 (YES in step S604). Upon receiving the authentication signal from the power receiving apparatus 111 (YES in step S605), the power transmitting apparatus 101 completes the connection sequence (step S606) and starts full power transmission (step S607). Note that during the full power transmission, the power transmitting apparatus 101 can periodically receive information about the reception power amount from the power receiving apparatus 111 via, for example, the communication unit 505 and confirm whether power is being transmitted at an appropriate efficiency. Subsequently, in response to receiving the power reception completion signal from the power receiving apparatus 111 (step S608), the power transmitting apparatus 101 completes the power transmission.

As described above, when unexpected power is detected in the power transfer performed by the first power transmitting unit 501 and the first power receiving unit 301 between the power transmitting apparatus 101 and the power receiving apparatus 111, power transfer using the second power transmitting unit 503 and the second power receiving unit 303 is performed. However, the power transfer by the second power transmitting unit 503 and the second power receiving unit 303 between the power transmitting apparatus 101 and the power receiving apparatus 111 can be switched again to the power transfer by the first power transmitting unit 501 and the first power receiving unit 301. For example, if the wireless power transfer method performed by the first power transmitting unit 501 and the first power receiving unit 301 can transfer a larger amount of power or can transfer power with higher efficiency than the wireless power transfer method performed by the second power transmitting unit 503 and the second power receiving unit 303, such switching can be performed again. In this case, while receiving power by the second power receiving unit 303, the power receiving apparatus 111 periodically switches to the first power receiving unit 301 to perform unexpected power detection. If no unexpected power is detected by the first power receiving unit 301, the power receiving apparatus 111 transmits, to the power transmitting apparatus 101, the method compliance confirming signal specifying the wireless power transfer method and frequency that the first power receiving unit 301 complies with. As the first power transmitting unit 501 can comply with the wireless power transfer method and frequency that the first power receiving unit 301 complies with, the power transmitting apparatus 101 transmits the response signal which indicates that the first power transmitting unit 501 complies with the specified wireless power transfer method and frequency. Consequently, the power transmitting apparatus 101 and the power receiving apparatus 111 can perform power transfer by the first power transmitting unit 501 and the first power receiving unit 301.

Note that, in this case, it is known that the power transmitting apparatus 101 can comply with the wireless power transfer method and frequency to which the first power receiving unit 301 complies with. Therefore, instead of the method compliance confirming signal, another signal that instructs switching of the wireless power transfer method can be transmitted from the power receiving apparatus 111 to the power transmitting apparatus 101. Subsequently, in response to receiving this signal, the power transmitting apparatus 101 switches the power transmitting unit and transmits the response signal. In response to receiving the response signal, the power receiving apparatus 111 switches the power receiving unit. That is, if the power transmitting apparatus 101 receives a signal that instructs switching to a wireless power transfer method which has been used in the past for power transmission to the power receiving apparatus 111, the power transmitting apparatus 101 determines to switch to the instructed wireless power transfer method and actually performs switching. Note that the power receiving apparatus 111 can switch the power receiving unit without waiting for the reception of the response signal, and thus the transmission of the response signal by the power transmitting apparatus 101 can be omitted.

Second Embodiment

Figure 7:
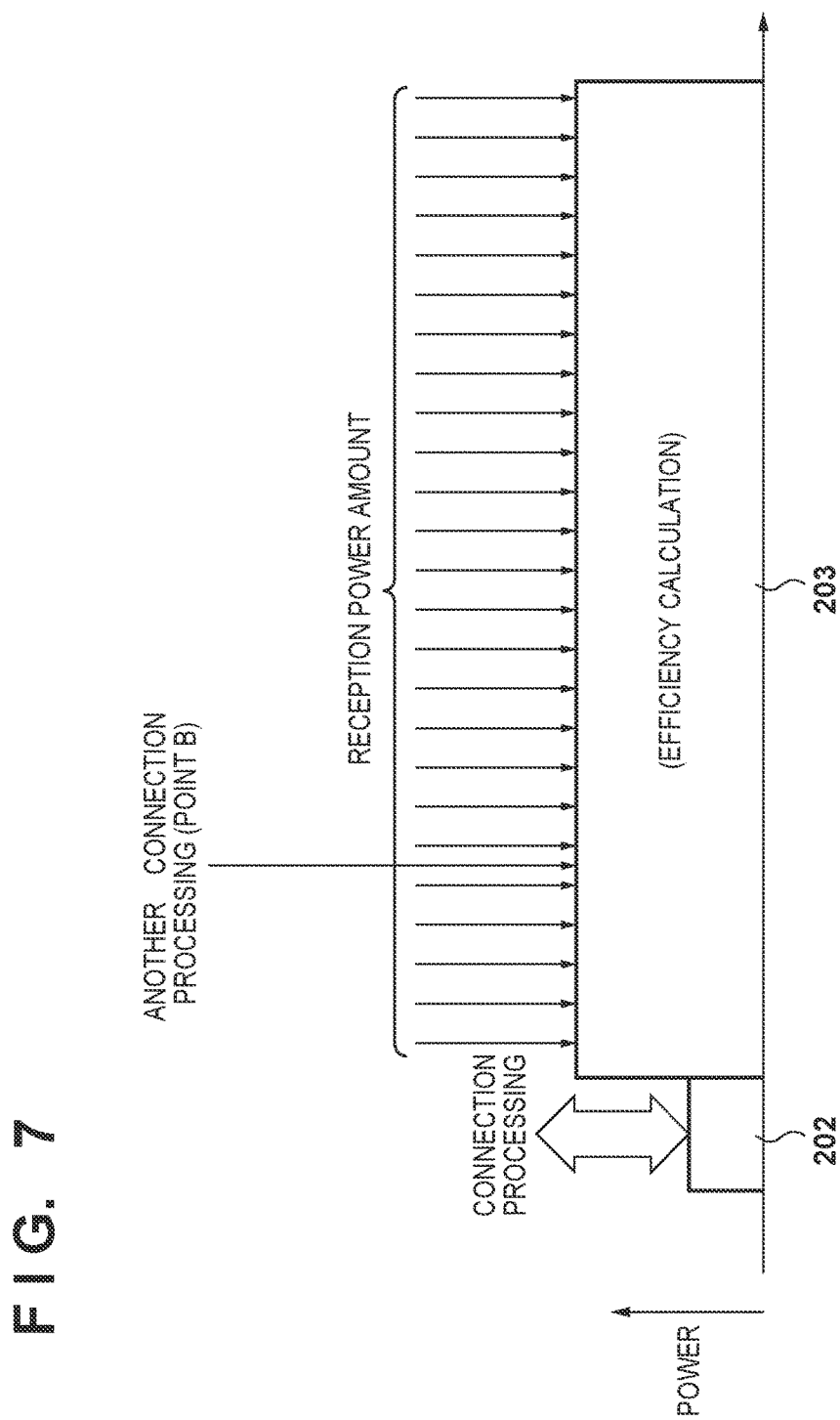
FIG. 7 is a second sequence chart showing the state of power transmission in a wireless power transfer system.

In the same manner as in the case of the power receiving apparatus 111 according to the first embodiment, if WPT is performed between a power transmitting apparatus 102 and a power receiving apparatus 112 when another pair of power transmitting apparatus 101 and power receiving apparatus 111 tries to start a wireless power transfer operation nearby, the reception power amount of the power receiving apparatus 112 can vary. FIG. 7 will be used to describe this state. FIG. 7 is a sequence chart showing the state of change according to the course of time of the power consumption of the power transmitting apparatus 102.

Note that during full power transmission to the power receiving apparatus 112, the power transmitting apparatus 102 periodically receives feedback of the amount of reception power from the power receiving apparatus 112. Assume that at the timing of point B, the power transmitting apparatus 102 intercepts an authentication signal transmitted to the other power transmitting apparatus 101 which is the WPT partner apparatus of the other power receiving apparatus 111 and subsequently intercepts the signal for connection processing with the power transmitting apparatus 101. In this case, the power transmitting apparatus 102 can detect, from intercepting these signals, that WPT between the other power transmitting apparatus and power receiving apparatus (power transmitting apparatus 101 and power receiving apparatus 111) is about to start near the power transmitting apparatus 102.

If WPT is performed by the power transmitting apparatus 101 and the power receiving apparatus 111 near the power transmitting apparatus 102, the power receiving apparatus 111 can receive unexpected power from the power transmitting apparatus 102. Additionally, if WPT is performed by the power transmitting apparatus 101 and the power receiving apparatus 111 near the power transmitting apparatus 102, the power receiving apparatus 112 that is the WPT partner apparatus of the power transmitting apparatus 102 can receive unexpected power from the power transmitting apparatus 101. Note that if the reception power amount fed back from the power receiving apparatus 112 changes, the power transmitting apparatus 102 can recognize that the power receiving apparatus 112 may have received unexpected power.

If the power receiving apparatuses 111 and 112 simultaneously receive this unexpected power and the power transmitted from the power transmitting apparatuses 101 and 102 that are their respective wireless power transfer partner apparatuses, various problems as described in the first embodiment can occur.

In contrast, the power transmitting apparatus 102 according to the second embodiment includes at least two power transmitting units that comply with different wireless power transfer methods. If the power transmitting apparatus 102 detects execution of WPT different from the WPT that it is performing with the power receiving apparatus 111 which is its wireless power transfer partner apparatus, the power transmitting apparatus 102 switches the wireless power transfer method.

The wireless power transfer method is the same as, for example, the first embodiment and a method which complies with the standards of Wireless Power Consortium (WPC), Power Matter Alliance (PMA), or Alliance for Wireless Power (A4WP). The power transmitting apparatus 102 and the power receiving apparatus 112 comply with, for example, at least two of these wireless power transfer methods.

The arrangements and operations of such power transmitting apparatus 102 and power receiving apparatus 112 will be described below.

(Arrangement of Power Transmitting Apparatus)

Figure 8:
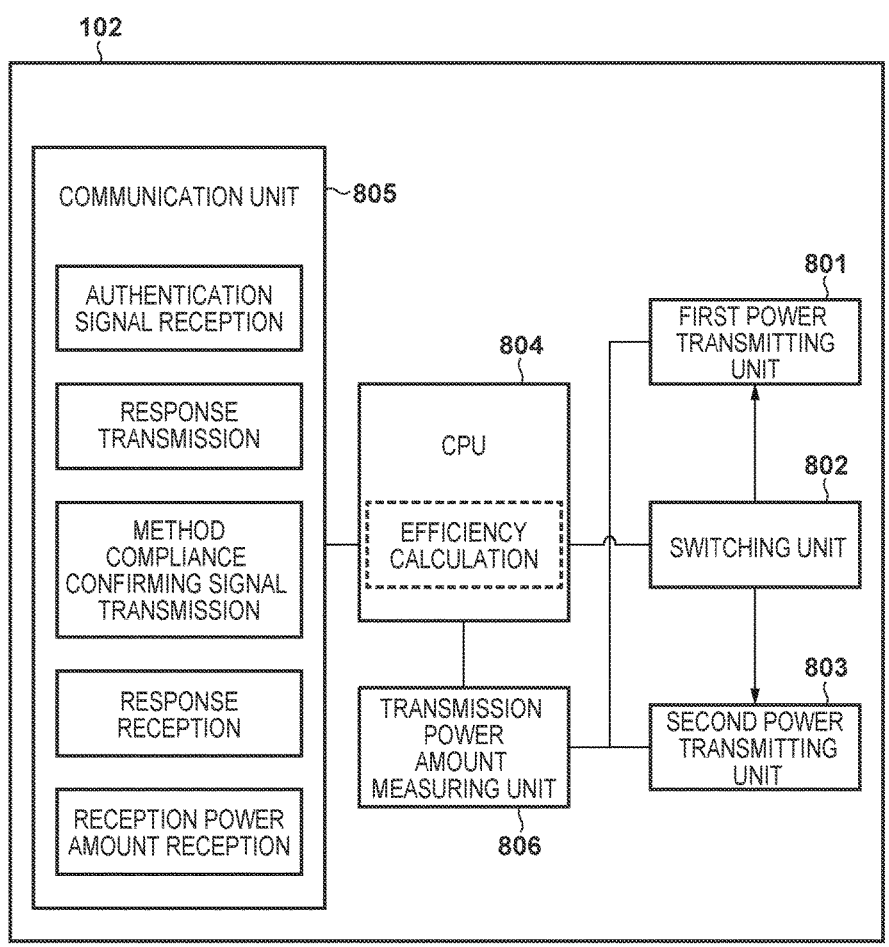
FIG. 8 is a block diagram showing a second example of the arrangement of a power transmitting apparatus.

FIG. 8 shows an example of the arrangement of the power transmitting apparatus 102. The power transmitting apparatus 102 includes in the arrangement, for example, a first power transmitting unit 801, a switching unit 802, a second power transmitting unit 803, a CPU 804, a communication unit 805, and a transmission power amount measuring unit 806. For example, the first power transmitting unit 801 complies with a resonant magnetic coupling method and the second power transmitting unit 803 complies with an electromagnetic induction method, and the power transmitting apparatus 102 transmits power to the power receiving apparatus 112 by using either the first power transmitting unit 801 or the second power transmitting unit 803. The switching unit 802 performs control to switch between using the first power transmitting unit 801 and the second power transmitting unit 803 in order to transmit power to the power receiving apparatus 112. The communication unit 805 performs communication with the WPT partner apparatus (power receiving apparatus 112). The transmission power amount measuring unit 806 measures the power amount transmitted to a wireless power transfer partner such as the power receiving apparatus 112.

The CPU 804 controls each function of the power transmitting apparatus 102 based on, for example, a memory (a RAM or a ROM) (not shown) or a program stored in another storage device. Note that although the CPU 804 is described as a "CPU", it can be replaced by one or more processors other than this. The CPU 804 executes, for example, a program that implements an efficiency calculation function for calculating the power transmission/reception efficiency by using the reception power amount of the power receiving apparatus 112 received from the power receiving apparatus 112 via the communication unit 805 and the transmission power amount measured by the transmission power amount measuring unit 806. Note that this power transmission/reception efficiency can be calculated at various points of time such as each time when the above-described reception power amount is received and the measurement result of the transmission power amount is updated, each predetermined cycle, or when the above-described reception power amount changes. Note that instead of obtaining the power transmission/reception efficiency by calculation, the CPU 804 can obtain the power transmission/reception efficiency by, for example, referring to a table in which the value of the transmission power amount, the value of the reception power amount, and the power transmission/reception efficiency are associated. That is, the CPU 804 can obtain the reception power amount notified from the power receiving apparatus 112 and the transmission power amount measured by the transmission power amount measuring unit 806 and refer to the reception power amount and the transmission power amount in the table that are closest to the obtained values. The CPU 804 can obtain the value of the power transmission/reception efficiency that corresponds to those referenced reception power amount and transmission power amount as the power transmission/reception efficiency that corresponds to the obtained reception power amount and the transmission power amount.

Note that the CPU 804 can determine, from the monitoring of the surrounding environment by the communication unit 805, that WPT by another power transmitting apparatus and power receiving apparatus has started. For example, if the communication unit 805 detects an authentication signal from the power receiving apparatus 111 or a response signal from the power transmitting apparatus 101 to the power receiving apparatus 111, the CPU 804 can determine that WPT by the other power transmitting apparatus and power receiving apparatus has started. If the communication unit 805 intercepts communication related to connection processing concerning another wireless power transfer operation, the CPU 804 can also determine that WPT by the other power transmitting apparatus and power receiving apparatus has started.

For example, if the power transmission/reception efficiency changes to a predetermined amount or more when WPT by another apparatus has started, the CPU 804 can detect that unexpected power transmission/reception has occurred. Unexpected power transmission/reception, in this case, can be about at least either the power receiving apparatus 112 receiving unexpected power from the other power transmitting apparatus or the power transmitting apparatus 101 transmitting unexpected power to the other power receiving apparatus 111. Note that the power transmitting apparatus 102 can determine that unexpected power transmission/reception has occurred, for example, when the reception power amount of the power receiving apparatus 112 which is the wireless power transfer partner apparatus has increased even though the power transmitting apparatus 102 has not increased the transmission power amount. That is, the power transmitting apparatus 102 can detect the occurrence of unexpected power transmission/reception not only by determining whether the power transmission/reception efficiency has changed after intercepting communication related to another WPT but also by other methods. One such example is the determination of whether the reception power amount of the power receiving apparatus 112 has increased (for example, has increased more than a predetermined amount) when the transmission power amount of the power transmitting apparatus 102 has been constant. Also, if the variation pattern of the reception power amount of the power receiving apparatus 112 matches with, for example, the cycle at which the placement confirming power is transmitted when the power transmitting apparatus starts the power transfer operation, it can be determined that the power receiving apparatus 112 is in an environment where it can receive unexpected power transmitted from the other power transmitting apparatus. In the same manner, whether the power transmitting apparatus 102 and the power receiving apparatus 112 are in an environment where unexpected power transmission/reception occurs or can occur can be determined by the time variation pattern of the power transmission/reception efficiency. The occurrence of unexpected power transmission/reception can be detected from a change in the transmission power amount of the power transmitting apparatus 102 or from a change in the current, voltage, impedance, and the like.

If the occurrence of such unexpected power transmission/reception is detected when the resonant magnetic coupling method of the first power transmitting unit 801 is selected in the power transmitting apparatus 102, the CPU 804 determines whether to switch the power transmitting unit to the second power transmitting unit 803. At this time, the CPU 804 makes an inquiry, via the communication unit 805, to the power receiving apparatus 112 of whether the power receiving apparatus 112 which is the wireless power transfer partner apparatus complies with the power transfer method (electromagnetic induction method) and frequency of the second power transmitting unit 803. If the power receiving apparatus 112 complies with the power transfer method and frequency of the second power transmitting unit 803, the CPU 804 controls the switching unit 802 to switch the power transmitting unit from the first power transmitting unit 801 to the second power transmitting unit 803. Note that if the power transfer method before the switching can transmit a larger amount of power or transmit power with higher efficiency, the method can be, for example, cyclically switched to the method before the switching and power can be transmitted by this method before the switching if no unexpected power is detected.

Note that the power transmitting apparatus 102 can hold the inquiry result of whether the power receiving apparatus 112 complies with the power transfer method and frequency of the second power transmitting unit 803. This allows the power transmitting apparatus 102 to switch the power transmitting unit to the second power transmitting unit 803 without having to make an inquiry to the power receiving apparatus 112 when unexpected power is subsequently detected while power is transmitted from the first power transmitting unit 801 to the power receiving apparatus 112. In this case, the power transmitting apparatus 102 can switch the power receiving unit of the power receiving apparatus 112 by transmitting only an instruction to switch the power receiving unit to the power receiving apparatus 112. If power transmission from the first power transmitting unit 801 of the power transmitting apparatus 102 stops dead, the power receiving apparatus 112 can also perform power detection using the power receiving unit corresponding to the second power transmitting unit 803 or signal detection for connection processing and automatically detect switching of the power transmitting unit in the power transmitting apparatus 102. In this case, the power transmitting apparatus 102 need not transmit even the instruction to switch the power receiving unit.

(Processing Sequence of Power Transmitting Apparatus)

Figure 9:
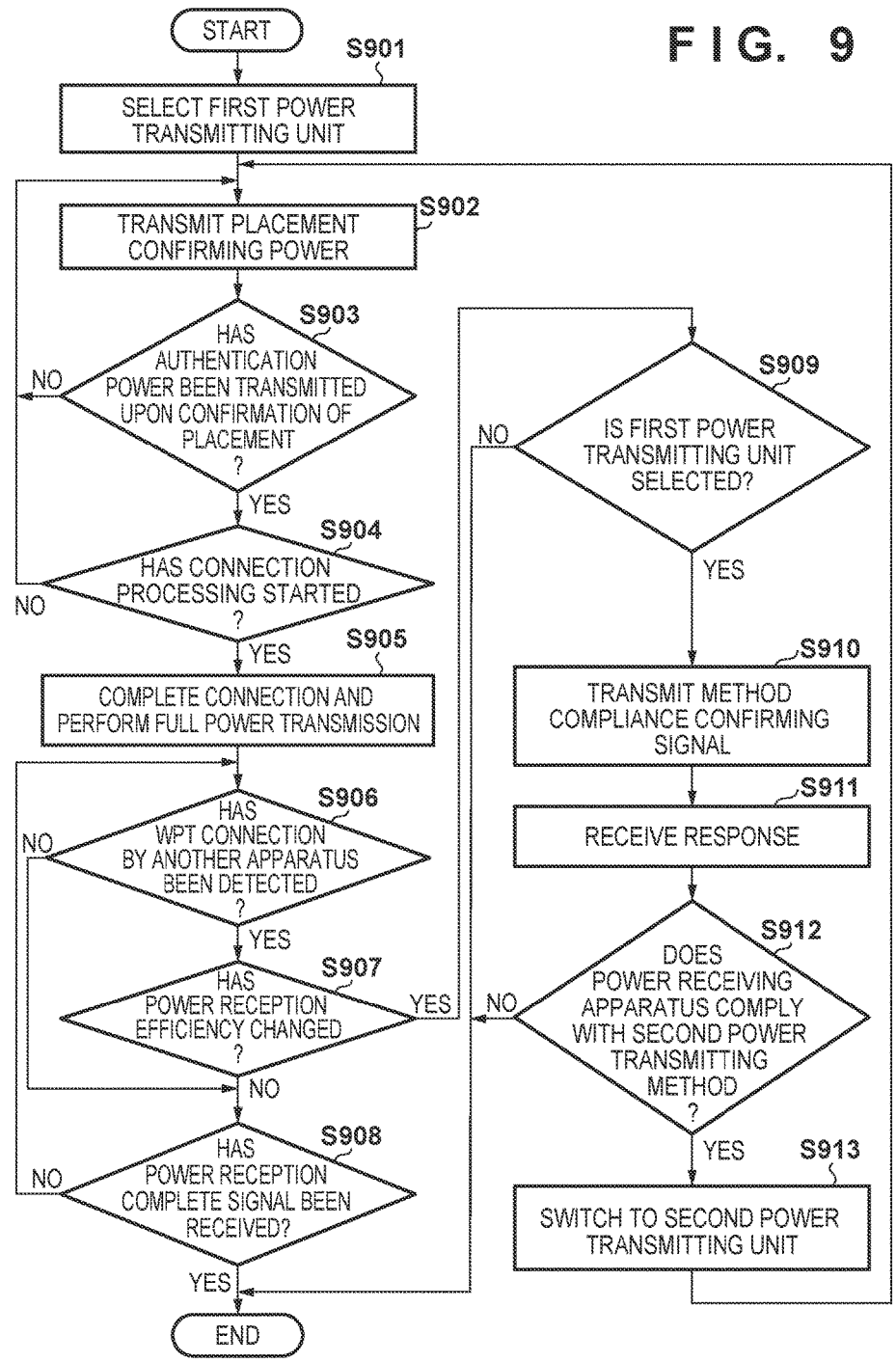
FIG. 9 is a flowchart showing a second example of the operation of the power transmitting apparatus.

FIG. 9 shows an example of the sequence of the processing executed by the power transmitting apparatus 102. The power transmitting apparatus 102 starts the processing of FIG. 9, for example, when a switch is pressed or when a power receiving apparatus is placed. Processing in which the power transmitting apparatus 102 includes two power transmitting units, the first power transmitting unit 801 and the second power transmitting unit 803, will be described below. However, the present invention is not limited to this. That is, the power transmitting apparatus 102 can have three or more power transmitting units.

First, based on a condition such as the maximum reception power amount or efficiency, the power transmitting apparatus 102 selects the first power transmitting unit 801 (step S901) out of the plurality of power transmitting units (first power transmitting unit 801 and the second power transmitting unit 803) that comply with the plurality of wireless power transfer methods that it complies with. Next, the power transmitting apparatus 102 transmits placement confirming power via the first power transmitting unit 801 (step S902). Upon confirming the placement of the power receiving apparatus 112, the power transmitting apparatus 102 transmits authentication power (YES in step S903) and starts the connection processing with the power receiving apparatus 112 (YES in step S904). After the connection processing is completed, the power transmitting apparatus 102 starts full power transmission (step S905).

After the start of full power transmission, the power transmitting apparatus 102 monitors for reception of authentication confirming signal from another power transmitting apparatus or power receiving apparatus or a response signal to that and monitors whether connection processing for WPT by another power transmitting apparatus or power receiving apparatus has been executed (step S906). Note that this monitoring is performed in order to determine that it has become a state in which WPT by at least another power transmitting apparatus or power receiving apparatus can be started.

Next, if WPT connection processing by another power transmitting apparatus or power receiving apparatus is confirmed (YES in step S906), the power transmitting apparatus 102 checks for a change in power reception efficiency (step S907). If no WPT connection processing by another apparatus is confirmed (NO in step S906) or if there is no change or the amount of change of the power reception efficiency is equal to or less than a predetermined amount (NO in step S907), the power transmitting apparatus 102 continues to transmit power. The power transmitting apparatus 102 waits to receive a power reception complete signal from the power receiving apparatus 112 (step S908). Subsequently, upon receiving the power reception complete signal from the power receiving apparatus 112 (YES in step S908), the power transmitting apparatus 102 terminates the processing. On the other hand, if no power reception complete signal is received from the power receiving apparatus 112 (NO in step S908), the power transmitting apparatus 102 continues to transmit power and returns to the detection processing for the WPT connection processing by another power transmitting apparatus or power receiving apparatus (step S906).

On the other hand, in step S907, if the power reception efficiency changes immediately after WPT connection processing by another power transmitting apparatus or power receiving apparatus has been confirmed (YES in step S907), the power transmitting apparatus 102 detects that unexpected power due to WPT by another power transmitting apparatus or power receiving apparatus has occurred. That is, the power transmitting apparatus 102 detects whether the power receiving apparatus 112 is receiving unexpected power from the power transmitting apparatus 101 nearby or the power transmitting apparatus 102 itself is transmitting unexpected power to the power receiving apparatus 111 nearby. Subsequently, the power transmitting apparatus 102 determines whether there is a power transmitting unit that has not been selected after the start of processing of FIG. 9 (step S909). Note that, since the power transmitting apparatus 102 includes only the first power transmitting unit 801 and the second power transmitting unit 803 in this case, the determination in step S909 is performed by determining whether the currently used power transmitting unit is the first power transmitting unit 801 which had been initially used.

If the first power transmitting unit 801 is selected as the currently used power transmitting unit (YES in step S909), the power transmitting apparatus 102 transmits a method compliance confirming signal to the power receiving apparatus 112 since there is a power transmitting unit that has not be selected after the start of processing of FIG. 9 (step S910). This method compliance confirming signal includes information specifying the power transfer method and frequency of the power transmitting unit that has not been selected after the start of processing of FIG. 9, the power receiving apparatus 112 that receives this signal then determines whether the apparatus itself complies with these specified power transfer method and frequency. Note that the method compliance confirming signal can include information related to one or a plurality of power transmitting units that the power transmitting apparatus 102 is currently trying to switch or information corresponding to one or more unspecified power transmitting units out of at least one or more power transmitting units included in the power transmitting apparatus 102. Note that the power transmitting apparatus 102 need not transmit the method compliance confirming signal if the second power transmitting unit 803 has been used in the past to transmit power to the power receiving apparatus 112 or if the power receiving apparatus 112 is known to comply with power transmitting units other than the first power transmitting unit 801.

If the method compliance confirming signal is transmitted, the power transmitting apparatus 102 receives a response signal from the power receiving apparatus 112 thereafter (step S911). If the power transmitting apparatus 102 can confirm that the power receiving apparatus 112 can comply with the power transfer method and frequency of its second power transmitting unit 803 (YES in step S912), the power transmitting apparatus 102 switches the power transmitting unit from the first power transmitting unit 801 to the second power transmitting unit 803 (step S914). Note that if no response signal has been received, the power transmitting unit may not be switched. However, if it is already known that the power receiving apparatus 112 can comply with the power transfer method and frequency of the second power transmitting unit 803, the power transmitting apparatus 102 can switch the power transmitting unit to the second power transmitting unit 803 even without receiving the response signal. In this case, when it is already known that the power receiving apparatus 112 can comply with the power transfer method and frequency of the second power transmitting unit 803, the power transmitting apparatus 102 can transmit not the method compliance confirming signal but a signal instructing the switching of the power receiving unit to the power receiving apparatus 112.

Subsequently, the power transmitting apparatus 102 performs the processes in steps S902 to S905 by the second power transmitting unit 803 and starts full power transmission by the second power transmitting unit 803. If a WPT connection by another power transmitting apparatus and power receiving apparatus that is using the same electromagnetic induction method as the power transfer method of the second power transmitting unit 803 is confirmed during the full power transmission (YES in step S906), the power transmitting apparatus 102 determines whether the power transmission/reception efficiency has changed immediately after this confirmation (step S907). Note that, for example, if the wireless power transfer method of the second power transmitting unit 803 is a method such as the electromagnetic induction method in which power reception is difficult unless the positions of power transmitting coil and the power receiving coil match, it can be assumed that the probability of the power receiving apparatus 112 receiving unexpected power from another power transmitting apparatus will be sufficiently low. In addition, it can be assumed that the probability of the power transmitted by the power transmitting apparatus 102 being received by another power receiving apparatus will be sufficiently low. That is, when the electromagnetic induction method (second power transmitting unit 803) is used, the probability of unexpected power transmission/reception occurring can be reduced. Therefore, the probability that no WPT connection processing by another apparatus will be confirmed (NO in step S906) or the power reception efficiency does not change or its amount of change is equal to or less than the predetermined amount (NO in step S907) will be high, and the power transmitting apparatus 102 can continue to transmit power as a result.

On the other hand, in step S907, if the power reception efficiency changes immediately after the WPT connection processing by another power transmitting apparatus or power receiving apparatus is confirmed (YES in step S907), the power transmitting apparatus 102 determines whether there is a power transmitting unit that has not been selected after the start of the processing of FIG. 9 (step S909). Note that in this case, as described above, since the power transmitting apparatus 102 includes only the first power transmitting unit 801 and the second power transmitting unit 803, the determination in step S909 is performed by determining whether the currently used power transmitting unit is the first power transmitting unit 801 which had been initially used. Since the power transmitting unit currently used at this point of time is the second power transmitting unit 803, the power transmitting apparatus 102 determines that there is no power transmitting unit that has not been selected after the start of the processing of FIG. 9 (NO in step S909) and terminates the processing. Note that if the power transmitting apparatus 102 includes three or more power transmitting units, instead of simply terminating the processing, the processing can be, for example, advanced to step S910 and a method compliance confirming signal that specifies another power transfer method can be transmitted.

Although it is not shown in FIG. 9, if the power transfer method of the first power transmitting unit 801 can transmit a larger amount of power or transmit power with higher efficiency than the power transfer method of the second power transmitting unit 803, the power transmitting apparatus 102 can switch back the power transmitting unit to the first power transmitting unit 801 again after the power transmitting unit had been switched to the second power transmitting unit 803. This switch back can be performed, for example, in accordance with the power transmitting apparatus 102 or the power receiving apparatus 112 detecting that the power transmission/reception between another power transmitting apparatus and another power receiving apparatus by using the power transfer method of the first power transmitting unit 801 has been terminated. The detection of the termination of power transmission/reception between another power transmitting apparatus and another power receiving apparatus can be performed by detecting the power reception complete signal from the other power receiving apparatus. Additionally, the power transmitting apparatus 102 and the power receiving apparatus 112 can perform detection of the termination of power transmission/reception between another power transmitting apparatus and another power receiving apparatus by at least temporarily changing the power transfer method to the power transfer method of the first power transmitting unit 801 and checking the power reception efficiency.

(Arrangement of Power Receiving Apparatus)

Figure 10:
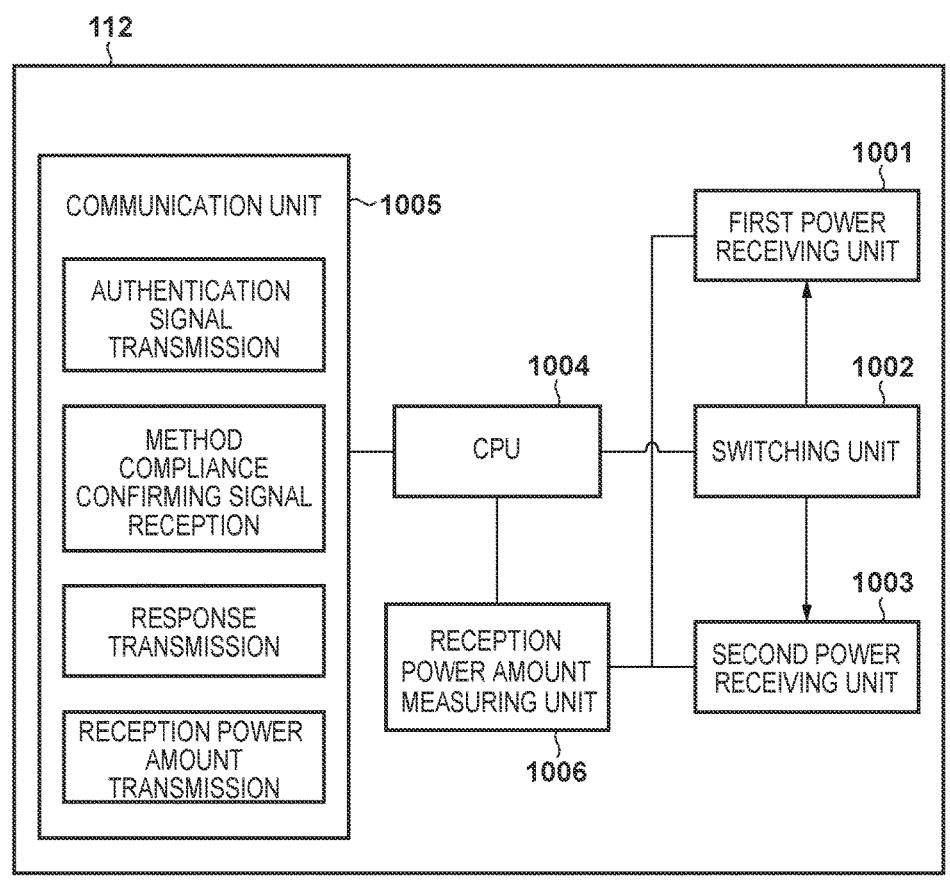
FIG. 10 is a block diagram showing a second example of the arrangement of a power receiving apparatus.

FIG. 10 shows an example of the arrangement of the power receiving apparatus 112. The power receiving apparatus 112 includes in the arrangement, for example, a first power receiving unit 1001, a switching unit 1002, a second power receiving unit 1003, a CPU 1004, a communication unit 1005, and a reception power amount measuring unit 1006. For example, the first power receiving unit 1001 complies with the resonant magnetic coupling method and the second power receiving unit 1003 complies with the electromagnetic induction method, and the power receiving apparatus 112 uses either the first power receiving unit 1001 or the second power receiving unit 1003 to receive power transmitted from the power transmitting apparatus 102. The switching unit 1002 performs control to switch between using the first power receiving unit 1001 and the second power receiving unit 1003 in order to receive power transmitted from the power transmitting apparatus 102. The reception power amount measuring unit 1006 measures the reception power amount received by the first power receiving unit 1001 or the second power receiving unit 1003.

The communication unit 1005 performs communication with the wireless power transfer partner apparatus (power transmitting apparatus 102). The CPU 1004 controls each function of the power receiving apparatus 112 based on, for example, a memory (a RAM or a ROM) (not shown) or a program stored in another storage device. Note that although the CPU 1004 is described as a "CPU", it can be replaced by one or more processors other than this. The CPU 1004 receives, via the communication unit 1005, the method compliance confirming signal from the power transmitting apparatus 102 and determines whether the second power receiving unit 1003 complies with the power transfer method (for example, the electromagnetic induction method) and frequency of the second power transmitting unit 803 of the power transmitting apparatus 102 specified by that signal. If the second power receiving unit 1003 can comply with the power transfer method and frequency of the second power transmitting unit 803 of the power transmitting apparatus 102, the CPU 1004 controls the switching unit 1002 to switch the power receiving unit to the second power receiving unit 1003. Additionally, the CPU 1004 controls the communication unit 1005 so that a signal including information about whether switching the power receiving unit is possible is transmitted as a response signal to the method compliance confirming signal from the power transmitting apparatus. The CPU 1004 also controls the communication unit 1005 so that the value of the reception power amount measured by the reception power amount measuring unit 1006 is sent to the power transmitting apparatus 102. Note that the value of the reception power amount can be the value itself or an indicator corresponding to that value.

(Processing Sequence of Power Receiving Apparatus)

Figure 11:
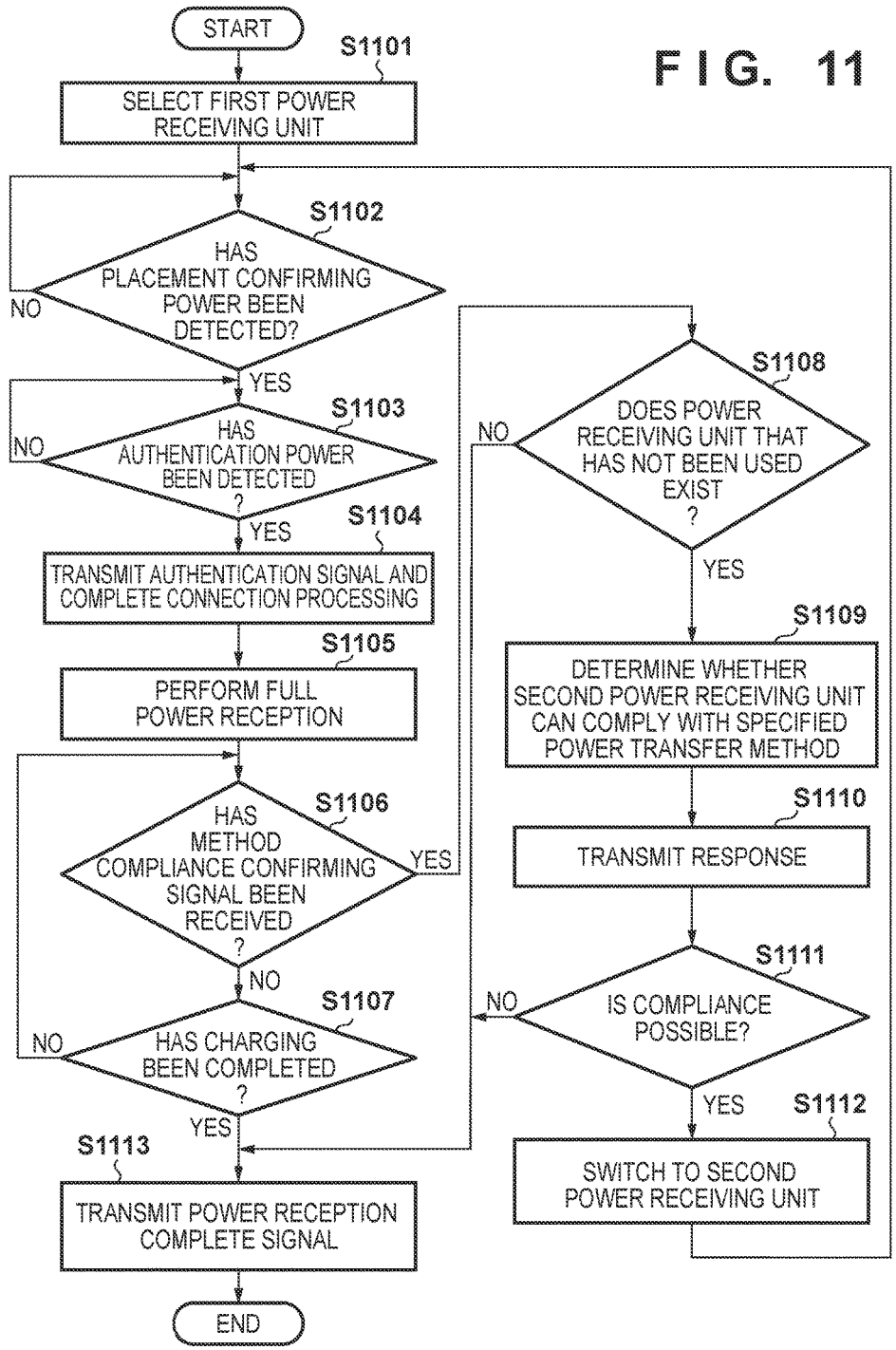
FIG. 11 is a flowchart showing a second example of the operation of the power receiving apparatus.
Figure 12A:
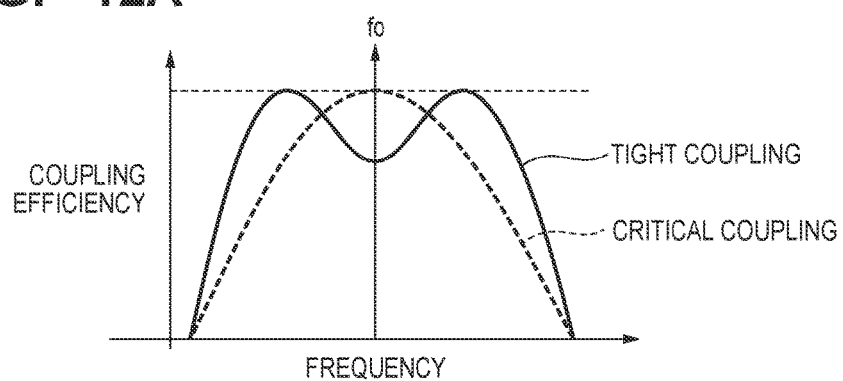
FIGS. 12A and 12B are graphs each explaining the three coupling states in a resonant magnetic coupling method.
Figure 12B:
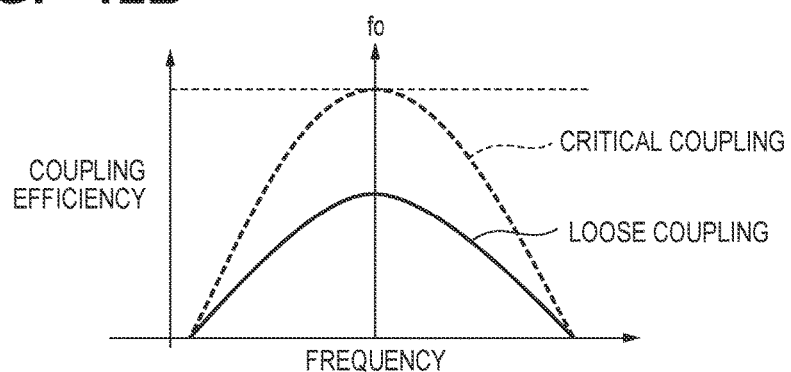
Figure 13:
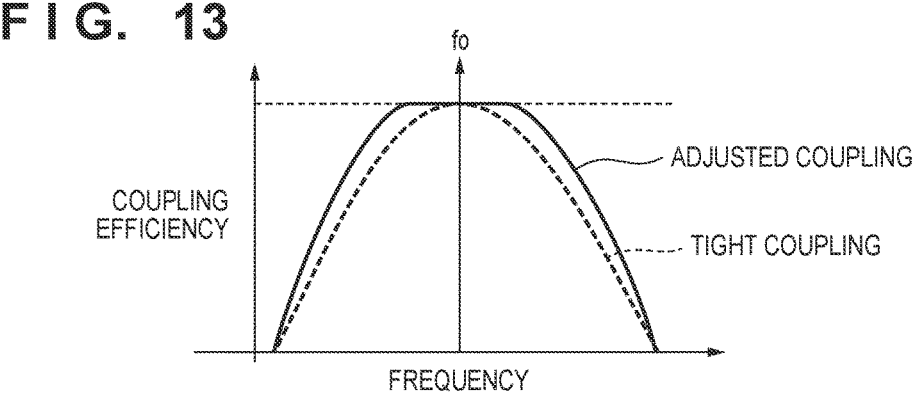
FIG. 13 is a graph showing a coupling state that has been adjusted by the resonant magnetic coupling method.

FIG. 11 shows an example of the sequence of the processing executed by the power receiving apparatus 112. The power receiving apparatus 112 starts the processing of FIG. 11, for example, when it is placed on a power transmitting apparatus or when a switch is pressed. Processing in which the power receiving apparatus 112 includes two power receiving units, the first power receiving unit 1001 and the second power receiving unit 1003, will be described below. However, the present invention is not limited to this. That is, the power receiving apparatus 112 suffices to include only one power receiving unit and can have three or more power receiving units.

First, based on a condition such as the maximum reception power amount or efficiency, the power receiving apparatus 112 selects the first power receiving unit 1001 (step S1101) out of the plurality of power receiving units (first power receiving unit 1001 and the second power receiving unit 1003) that comply with the plurality of wireless power transfer methods that it complies with. When placement confirming power has been received via the first power receiving unit 1001 (YES in step S1102) and the authentication power is detected (YES in step S1103), the power receiving apparatus 112 transmits an authentication signal (step S1104). Next, the power receiving apparatus 112 completes the connection processing with the power transmitting apparatus 102 after receiving a response signal or the like (step S1104). After the connection processing, full power transmission from the power transmitting apparatus 102 is started (step S1105), and the power receiving apparatus 112 receives the power transmitted by the power transmitting apparatus 102. The power receiving apparatus 112 subsequently monitors whether it will receive the method compliance confirming signal from the power transmitting apparatus 102 (step S1106). If no method compliance confirming signal is received (NO in step S1106), the power receiving apparatus 112 determines whether the charging has been completed (step S1107). If the charging has not been completed, the power receiving apparatus 112 continues to receive power while continuing the monitoring for the reception of the method compliance confirming signal. When the charging is complete (YES in step S1107), the power receiving apparatus 112 transmits the power reception complete signal to the power transmitting apparatus 102 (step S1113) and terminates the processing.

On the other hand, if the method compliance confirming signal is received from the power transmitting apparatus 102 (YES in step S1106) during full power reception, the power receiving apparatus 112 determines whether a power receiving unit that has not been used exists since the start of the processing of FIG. 11 (step S1108). Note that, in this case, since the power receiving apparatus 112 includes only the first power receiving unit 1001 and the second power receiving unit 1003 and is using the first power receiving unit 1001, it is determined that another power receiving unit exists (YES in step S1108). Therefore, the power receiving apparatus 112 subsequently confirms the power transfer method (and the frequency in some cases) of the second power transmitting unit 803 of the power transmitting apparatus 102 that was specified in in the method compliance confirming signal. The power receiving apparatus 112 determines whether the second power receiving unit 1003 of the power receiving apparatus 112 complies with that power transfer method (step S1109) and transmits a response signal indicating this determination result (step S1110). Note that if the power receiving apparatus 112 has received power from the power transmitting apparatus 102 by using the second power receiving unit 1003, a signal indicating an instruction to use the second power receiving unit 1003 to receive power can be transmitted from the power transmitting apparatus 102 instead of the method compliance confirming signal. In this case, the power receiving apparatus 112 can switch the power receiving unit without transmitting a response signal to the power transmitting apparatus 102.

If the second power receiving unit 1003 of the power receiving apparatus 112 complies with the specified power transfer method (and frequency) (YES in step S1111), the power receiving apparatus 112 switches the power receiving unit to the second power receiving unit 1003. On the other hand, since no other power receiving unit exits if the second power receiving unit 1003 of the power receiving apparatus 112 does not comply with the specified power transfer method (and frequency) (NO in step S1111), the power receiving apparatus 112 transmits the reception complete signal to the power transmitting apparatus 102 (step S1113) and terminates the processing. The connection processing and full power reception by the second power receiving unit 1003 (steps S1102 to S1105) are executed. If the method compliance confirming signal is received during execution of the full power reception using the second power receiving unit 1003 (YES in step S1106), the power receiving apparatus 112 subsequently performs the determination in step S1108. In this case, since the second power receiving unit 1003 is used and since the first power receiving unit 1001 has been also used after the start of processing of FIG. 11, it is determined that no other power receiving unit exists (NO in step S1108). Therefore, since this indicates that both of the first power receiving unit 1001 and the second power receiving unit 1003 detect unexpected power by another WPT, the power receiving apparatus 112 transmits the power reception complete signal (step S1113) and terminates the processing.

Although the wireless power transfer method of the first power receiving unit 301/1001 and the first power transmitting unit 501/801 was the resonant magnetic coupling method and the wireless power transfer method of the second power receiving unit 303/1003 and the second power transmitting unit 503/803 was the electromagnetic induction method in the above description, other methods can be used as the wireless power transfer methods of these units. Also, although the above description has described switching between two power receiving units and between two power transmitting units, switching of the wireless power transfer method or frequency can be performed by switching between three or more power receiving units or power transmitting units. Further, although the above description has described how unexpected power is detected by the power amount received in a period other than the periods when the placement confirming power is received, unexpected power can be detected by another method such as a method using the authentication power amount or the change in the transmission power amount of the placement confirming power, power amount during the intermittent periods of the authentication power, or the like. The placement confirming power and authentication power can be implemented by different sources of power or by a common source of power.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-028862, filed Feb. 17, 2015 and 2015-028863, filed Feb. 17, 2015 which are hereby incorporated by reference herein in their entirety.

What is claimed is:

1. A power receiving apparatus that complies with at least two power transfer methods and receives power wirelessly from a power transmitting apparatus, comprising:
   a detecting unit configured to detect power transmitted from another power transmitting apparatus which is different from the power transmitting apparatus while a first power transfer method is used out of the at least two power transfer methods; and
   a control unit configured to control, when the power transmitted from the other power transmitting apparatus is detected, the power transmitting apparatus and the power receiving apparatus so that a second power transfer method different from the first power transfer method out of the at least two power transfer methods is used, wherein a frequency used for wireless power transfer by the first power transfer method and a frequency used for wireless power transfer by the second power transfer method are different.

2. The power receiving apparatus according to claim 1, further comprising:
a communication unit capable of transmitting a signal to the power transmitting apparatus and receiving a signal from the power transmitting apparatus,
wherein when the power transmitted from the other power transmitting apparatus is detected while the first power transfer method is used, the control unit controls the communication unit so that a signal confirming whether compliance with power transmission by the second power transfer method is possible is transmitted to the power transmitting apparatus,
when the communication unit receives, from the power transmitting apparatus, a signal indicating that compliance with the power transmission by the second power transfer method is possible, the control unit further switches the power transfer method of the power receiving apparatus to the second power transfer method, and
when the power transmitting apparatus transmits the signal indicating that compliance with power transmission by the second power transfer method is possible, the power transmitting apparatus switches the power transfer method of the power transmitting apparatus to the second power transfer method.

3. The power receiving apparatus according to claim 2, wherein the signal which is transmitted by the communication unit and confirms whether compliance with the power transmission by the second power transfer method is possible includes information of the frequency used for wireless power transfer by the second power transfer method.

4. The power receiving apparatus according to claim 2, wherein when the communication unit does not receive, from the power transmitting apparatus, the signal indicating that compliance with the power transmission by the second power transfer method is possible, the control unit controls the power receiving apparatus so that the power transfer method of the power receiving apparatus is not switched.

5. The power receiving apparatus according to claim 1, further comprising:
a communication unit capable of transmitting a signal to the power transmitting apparatus,
wherein when power transmitted by the other power transmitting apparatus is detected while the first power transfer method is used, the control unit controls the power receiving apparatus to use the second power transfer method and controls the communication unit to transmit to the power transmitting apparatus a signal which instructs power to be transmitted by the second power transfer method.

6. The power receiving apparatus according to claim 1, wherein the detecting unit further detects the power transmitted from the other power transmitting apparatus after the power transfer method used by the power receiving apparatus and the power transmitting apparatus is switched, and
when the power transmitted from the other power transmitting apparatus is detected by either of the at least two power transfer methods, the control unit controls so that the power transfer with the power transmitting apparatus is terminated.

7. A control method for a power receiving apparatus that complies with at least two power transfer methods and receives power wirelessly from a power transmitting apparatus, comprising:
detecting power transmitted from another power transmitting apparatus which is different from the power transmitting apparatus while a first power transfer method is used out of the at least two power transfer methods; and
when the power transmitted from the other power transmitting apparatus is detected, controlling the power transmitting apparatus and the power receiving apparatus so that a second power transfer method different from the first power transfer method out of the at least two power transfer methods is used,
wherein a frequency used for wireless power transfer by the first power transfer method and a frequency used for wireless power transfer by the second power transfer method are different.

8. A non-transitory computer-readable storage medium storing a computer program for causing a computer, provided in a power receiving apparatus that complies with at least two power transfer methods and receives power wirelessly from a power transmitting apparatus,
to detect power transmitted from another power transmitting apparatus which is different from the power transmitting apparatus while a first power transfer method is used out of the at least two power transfer methods; and
when the power transmitted from the other power transmitting apparatus is detected, to control the power transmitting apparatus and the power receiving apparatus so that a second power transfer method different from the first power transfer method out of the at least two power transfer methods is used,
wherein a frequency used for wireless power transfer by the first power transfer method and a frequency used for wireless power transfer by the second power transfer method are different.

9. A power transmitting apparatus that complies with at least two power transfer methods and transmits power wirelessly to a power receiving apparatus, comprising:
a power transmitting unit configured to transmit power to the power receiving apparatus by using one of the at least two power transfer methods;
a detecting unit configured to detect that, while a first power transfer method is used out of the at least two power transfer methods, at least either the power receiving apparatus receives power transmitted from another power transmitting apparatus or another power receiving apparatus receives power transmitted from the power transmitting apparatus, that is caused by that the other power transmitting apparatus and the other power receiving apparatus perform power transfer; and
a control unit configured to control, when the detecting unit detects that at least either the power receiving apparatus receives power transmitted from the other power transmitting apparatus or the other power receiving apparatus receives power transmitted from the power transmitting apparatus, the power transmitting unit to use a second power transfer method different from the first power transfer method out of the at least two power transfer methods,
wherein a frequency used for wireless power transfer by the first power transfer method and a frequency used for wireless power transfer by the second power transfer method are different.

10. The power transmitting apparatus according to claim 9, further comprising:
- a communication unit capable of transmitting a signal to the power receiving apparatus and receiving a signal from the power receiving apparatus,
- wherein when the detecting unit detects that at least either the power receiving apparatus receives power transmitted from the other power transmitting apparatus or the other power receiving apparatus receives power transmitted from the power transmitting apparatus while the first power transfer method is used, the control unit controls the communication unit so that a signal confirming whether compliance with power reception by the second power transfer method is possible is transmitted to the power receiving apparatus,
- when the communication unit receives, from the power receiving apparatus, a signal indicating that compliance with the power reception by the second power transfer method is possible, the control unit further controls the power transmitting unit so that the power transfer method of the power transmitting apparatus is switched to the second power transfer method, and
- when the power receiving apparatus transmits the signal indicating that compliance with power reception by the second power transfer method is possible, the power receiving apparatus switches the power transfer method of the power receiving apparatus to the second power transfer method.

11. The power transmitting apparatus according to claim 10, wherein a signal which is transmitted by the communication unit and confirms whether compliance with power reception by the second power transfer method is possible includes information of a frequency that the power transmitting apparatus can transmit power by the second power transfer method.

12. The power transmitting apparatus according to claim 10, wherein when the communication unit does not receive, from the power receiving apparatus, a signal indicating that compliance with power reception by the second power transfer method is possible, the control unit controls the power transmitting unit so the power transfer method of the power transmitting apparatus is not switched.

13. The power transmitting apparatus according to claim 9, further comprising:
- a communication unit capable of transmitting a signal to the power receiving apparatus,
- wherein when the detecting unit detects that at least either the power receiving apparatus receives power transmitted from the other power transmitting apparatus or the other power receiving apparatus receives power transmitted from the power transmitting apparatus while the first power transfer method is used, the control unit controls the power transmitting unit to use the second power transfer method and controls the communication unit to transmit to the power receiving apparatus a signal which instructs power to be received by the second power transfer method.

14. The power transmitting apparatus according to claim 9, wherein the detecting unit detects that, based on reception power amount of the power receiving apparatus, at least either the power receiving apparatus receives power transmitted from the other power transmitting apparatus or the other power receiving apparatus receives power transmitted from the power transmitting apparatus.

15. The power transmitting apparatus according to claim 14, wherein the detecting unit obtains power transmission/reception efficiency from the reception power amount and transmission power amount transmitted by the power transmitting apparatus and detects that, based on the power transmission/reception efficiency, at least either the power receiving apparatus receives power transmitted from the other power transmitting apparatus or the other power receiving apparatus receives power transmitted from the power transmitting apparatus.

16. The power transmitting apparatus according to claim 15, wherein the detecting unit detects, based on a change in the power transmission/reception efficiency after detecting a signal or power transmitted by the other power transmitting apparatus or the other power receiving apparatus, that at least either the power receiving apparatus receives power transmitted from the other power transmitting apparatus or the other power receiving apparatus receives power transmitted from the power transmitting apparatus.

17. The power transmitting apparatus according to claim 9, wherein the detecting unit further detects, after the power transfer method used by the power receiving apparatus and the power transmitting apparatus is switched, that at least either the power receiving apparatus receives power transmitted from the other power transmitting apparatus or the other power receiving apparatus receives power transmitted from the power transmitting apparatus, and
- when it is detected that at least either the power receiving apparatus receives power transmitted from the other power transmitting apparatus or the other power receiving apparatus receives power transmitted from the power transmitting apparatus in either one of the at least two power transfer methods, the control unit controls the power transmitting unit so that power transfer with the power receiving apparatus is terminated.

18. A control method for a power transmitting apparatus that includes a power transmitting unit configured to transmit power to a power receiving apparatus by using one of at least two power transfer methods, complies with the at least two power transfer methods, and transmits power wirelessly to the power receiving apparatus, comprising:
- detecting, while a first power transfer method is used out of the at least two power transfer methods, that at least either the power receiving apparatus receives power transmitted from another power transmitting apparatus or another power receiving apparatus receives power transmitted from the power transmitting apparatus, that is caused by that the other power transmitting apparatus and the other power receiving apparatus perform power transfer; and
- when detected that at least either the power receiving apparatus receives power transmitted from the other power transmitting apparatus or the other power receiving apparatus receives power transmitted from the power transmitting apparatus, controlling the power transmitting unit to use a second power transfer method different from the first power transfer method out of the at least two power transfer methods,
- wherein a frequency used for wireless power transfer by the first power transfer method and a frequency used for wireless power transfer by the second power transfer method are different.

19. A non-transitory computer-readable storage medium storing a computer program for causing a computer, provided in a power transmitting apparatus that includes a power transmitting unit configured to transmit power to a power receiving apparatus by using one of at least two power transfer methods, complies with at least two power transfer methods, and transmits power wirelessly to a power receiving apparatus,
- to detect, while a first power transfer method is used out of the at least two power transfer methods, that at least either the power receiving apparatus receives power transmitted from another power transmitting apparatus or another power receiving apparatus receives power transmitted from the power transmitting apparatus, that is caused by that the other power transmitting apparatus and the other power receiving apparatus perform power transfer, and
- when detected that at least either the power receiving apparatus receives power transmitted from the other power transmitting apparatus or the other power receiving apparatus receives power transmitted from the power transmitting apparatus, to control the power transmitting unit to use a second power transfer method different from the first power transfer method out of the at least two power transfer methods,
- wherein a frequency used for wireless power transfer by the first power transfer method and a frequency used for wireless power transfer by the second power transfer method are different.

* * * * *